(12) United States Patent
Elliot et al.

(10) Patent No.: US 12,386,882 B2
(45) Date of Patent: Aug. 12, 2025

(54) SYSTEMS AND METHODS FOR PROCESSING AUDIOVISUAL DATA USING LATENT CODES FROM GENERATIVE NETWORKS AND MODELS

(71) Applicant: Unknot Inc., Parkland, FL (US)

(72) Inventors: Ross F. Elliot, Parkland, FL (US); Seth Haberman, New York, NY (US); Michael A. Baumer, Bethesda, MD (US); Nakul Darwa, Miami, FL (US)

(73) Assignee: UNKNOT INC., Parkland, FL (US)

( * ) Notice: Subject to any disclaimer, the term of this patent is extended or adjusted under 35 U.S.C. 154(b) by 0 days.

(21) Appl. No.: 18/076,900

(22) Filed: Dec. 7, 2022

(65) Prior Publication Data

US 2023/0114301 A1   Apr. 13, 2023

Related U.S. Application Data

(63) Continuation of application No. 17/093,359, filed on Nov. 9, 2020, now Pat. No. 11,531,895.

(Continued)

(51) Int. Cl.
| | |
|---|---|
| *G06F 16/532* | (2019.01) |
| *G06F 16/535* | (2019.01) |
| *G06F 18/2113* | (2023.01) |
| *G06N 3/08* | (2023.01) |
| *G06T 9/00* | (2006.01) |
| *G06V 10/82* | (2022.01) |
| *G06V 30/19* | (2022.01) |
| *G06V 30/194* | (2022.01) |

(52) U.S. Cl.
CPC .......... *G06F 16/532* (2019.01); *G06F 16/535* (2019.01); *G06F 18/2113* (2023.01); *G06N 3/08* (2013.01); *G06T 9/002* (2013.01); *G06V 10/82* (2022.01); *G06V 30/19173* (2022.01); *G06V 30/194* (2022.01)

(58) Field of Classification Search
None
See application file for complete search history.

(56) References Cited

U.S. PATENT DOCUMENTS

| | | | |
|---|---|---|---|
| 11,019,364 B2 * | 5/2021 | Liu | H04N 19/597 |
| 11,217,009 B2 * | 1/2022 | von Cramon | H04N 23/73 |

(Continued)

*Primary Examiner* — Anand P Bhatnagar
(74) *Attorney, Agent, or Firm* — Daly, Crowley, Mofford & Durkee, LLP

(57) ABSTRACT

Systems and methods for viewing, storing, transmitting, searching, and editing application-specific audiovisual content (or other unstructured data) are disclosed in which edge devices generate content on the fly from a partial set of instructions rather than merely accessing the content in its final or near-final form. An image processing architecture may include a generative model that may be a deep learning model. The generative model may include a latent space comprising a plurality of latent codes and a trained generator mapping. The trained generator mapping may convert points in the latent space to uncompressed data points, which in the case of audiovisual content may be generated image frames. The generative model may be capable of closely approximating (up to noise or perceptual error) most or all potential data points in the relevant compression application, which in the case of audiovisual content may be source images.

20 Claims, 12 Drawing Sheets

Related U.S. Application Data

(60) Provisional application No. 62/932,603, filed on Nov. 8, 2019.

(56) References Cited

U.S. PATENT DOCUMENTS

| | | |
|---|---|---|
| 11,245,927 B2* | 2/2022 | Liu ........................ H04N 19/20 |
| 11,252,417 B2* | 2/2022 | Andreopoulos ... H04N 21/2662 |
| 2020/0242736 A1* | 7/2020 | Liu ........................... G06T 3/60 |
| 2020/0304835 A1* | 9/2020 | Liu ........................ H04N 19/91 |
| 2021/0019541 A1* | 1/2021 | Wang ................... G06V 40/172 |
| 2021/0211684 A1* | 7/2021 | Andreopoulos ....... G06N 3/045 |
| 2021/0258611 A1* | 8/2021 | Liu ........................ G06N 3/088 |
| 2021/0271707 A1* | 9/2021 | Lin ....................... G06F 16/538 |
| 2021/0295592 A1* | 9/2021 | von Cramon ........... G06T 17/00 |
| 2021/0358177 A1* | 11/2021 | Park ........................ G06N 3/08 |

* cited by examiner

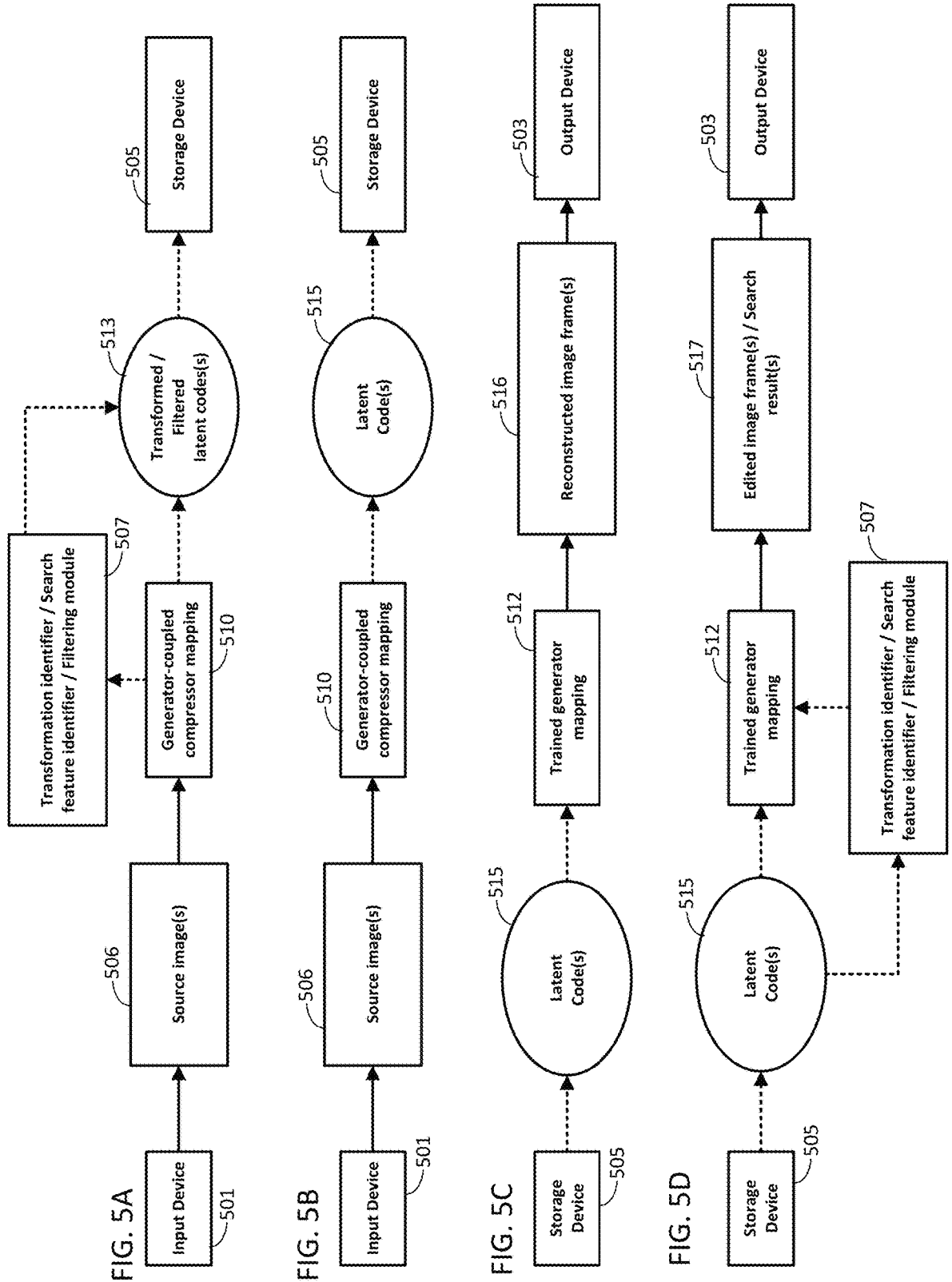

SYSTEMS AND METHODS FOR PROCESSING AUDIOVISUAL DATA USING LATENT CODES FROM GENERATIVE NETWORKS AND MODELS

CROSS REFERENCE TO RELATED APPLICATIONS

This application is a continuation of U.S. Utility application Ser. No. 17/093,359, filed on Nov. 9, 2020, which claims the benefit of U.S. Provisional Application No. 62/932,603, filed on Nov. 8, 2019, the contents of which are incorporated by reference in their entirety as if fully set forth herein.

This application is related to U.S. patent application Ser. No. 17/093,380, entitled SYSTEMS AND METHODS FOR EDITING AUDIOVISUAL DATA USING LATENT CODES FROM GENERATIVE NETWORKS AND MODELS, filed on Nov. 9, 2020 and U.S. patent application Ser. No. 17/093,386, entitled SYSTEMS AND METHODS FOR SEARCHING AUDIOVISUAL DATA USING LATENT CODES FROM GENERATIVE NETWORKS AND MODELS, filed on Nov. 9, 2020 now issued as U.S. Pat. No. 11,593,652 issued on Feb. 28, 2023, the contents of which are incorporated by reference in their entirety as if fully set forth herein.

FIELD OF TECHNOLOGY

The described technology generally relates to data compression, storage, and transmission, more particularly, to generative data models and the use of latent codes for compression, encryption, editing, searching and other processing of audiovisual and other unstructured data.

BACKGROUND

Traditional compression algorithms encode a data source using fewer bits than the original representation. These algorithms are either lossless or lossy, depending on whether they do or do not reproduce the original data source without any loss of information. Lossy compression is particularly useful for visual and audio data, since what matters is often the human perception of the quality of the reproduced data, as opposed to an identical bitwise reproduction. Lossy compression works by eliminating both statistical redundancy and nonessential details. Lossless compression algorithms are often used in conjunction with lossy ones to improve compression rates. The algorithms that encode and decode the compressed signal are referred to as the encoder and decoder, the pair is called a codec.

A widely used tactic for lossy codecs for audio and visual data is a transform coding, where a transformation is applied to the original signal so that it is now re-expressed as a sum of discrete or quantized components. This re-expression is constructed so that, although all components are needed to fully reconstruct the original signal, most of the perceptually relevant information is in a smaller proportion of the components. These relevant components can then be used to reconstruct a non-identical, but perceptually similar copy of the original.

There are some key shortcomings to existing, commonly used lossy compression algorithms including being unable to take advantage of conditional distributions (i.e., the use of mathematical transforms that are agnostic to the content of the data), manual feature (statistical regularities) selection, and limited readability and malleability of compressed content, to name but a few.

SUMMARY

Aspects of the present disclosure relate to a novel paradigm for viewing, storing, transmitting, searching, and editing application-specific audiovisual content (or other unstructured data) in which edge devices generate content on the fly from a partial set of instructions rather than merely accessing the content in its final or near-final form. In such a paradigm, only the instructions need to be stored or transmitted over the network. Among the positive, practical and concrete implications of the disclosure are improved compression, security, searching, and editing capabilities, at the cost of requiring increased computing capabilities at the edge.

According to one aspect of the disclosure, a system for processing source images is provided. The system may include a representative data set including a plurality of source images and a processing module. The processing module may be configured to process source images and derived from the representative data set. The processing module may include a trained generative model. The trained generative model may further include a latent space comprising a plurality of latent codes and a trained generator mapping configured to map latent codes to one or more generated image frames that share at least one characteristic feature with at least one of the source images in the representative data set. A generator-coupled compressor mapping may be configured to map one or more of the source images to one or more resulting latent codes. The trained generator mapping may map the one or more resulting latent codes to one or more reconstructed image frames resembling the one or more source images.

According to another aspect, a system for producing generator-coupled compressor mappings is disclosed. The system may include a representative data set including a plurality of source images, an untrained generative model comprising a latent space and an untrained generator mapping. The latent space may include a plurality of latent codes. The untrained generator mapping may use a plurality of parameters to map each latent code to a generated image. A generator pretraining module may preprocess a first subset of the representative dataset. A quality assessment module may be configured to convert image frames into quantities that assess the degree to which those image frames share characteristic features with image frames in the first subset of the representative data set preprocessed by the generator pretraining module.

A generator training module may modify the untrained generative model to optimize the result of the quality assessment module when applied to the output of the untrained generator mapping, thereby producing a trained generative model comprising the latent space and a trained generator mapping. An uncoupled compressor may map image frames to latent codes and a compressor pretraining module may preprocess a second subset of the representative dataset. A reconstruction assessment module may be configured to convert a source image and latent code pair into a quantity. The quantity may assess the degree to which the source image resembles a reconstructed image frame. The reconstructed image frame may be produced by the latent code and the trained generator mapping.

A compressor training module may optimize the uncoupled compressor mapping by changing its parameters to minimize the output of the reconstruction assessment module when applied to the image frames in the second subset of the representative data set preprocessed by the compressor training model paired with the latent codes produced by applying the uncoupled compressor mapping to those image frames, producing a generator-coupled compressor mapping.

According to another aspect, a method for processing source images is provided. A representative data set may be defined including a plurality of source images. A trained generative model may be derived from the representative data set. The trained generative model may include a latent space including a plurality of latent codes. One or more of the source images may be mapped to one or more resulting latent codes. The mapping of the one or more resulting latent codes to one or more reconstructed image frames may resemble the one or more source images. One or more resulting latent codes may be mapped to generated image frames that share at least one characteristic feature with at least one of the source images in the representative data set.

According to another aspect of the disclosure, a system for editing source images is disclosed. A representative data set may include a plurality of source images. A transformation module may be configured to implement intended transformations of source images and derived from the representative data set. The transformation module may include a trained generative model which may further include a latent space comprising a plurality of latent codes and a trained generator mapping configured to map latent codes to generated image frames that share at least one characteristic feature with at least one of the source images in the representative data set.

A generator-coupled compressor mapping may be configured to map one or more of the source images to one or more resulting latent codes, wherein the trained generator mapping maps the one or more resulting latent codes to one or more reconstructed image frames resembling the one or more source images.

One or more generator-coupled transformation identifiers may be configured to transform one or more latent codes. The transformations may correspond to one or more intended transformations of one or more source images.

According to another aspect of the disclosure, a system for producing generator-coupled transformation identifiers corresponding to intended transformations is disclosed. A representative data set may include a plurality of source images. An untrained generative model may comprise a latent space and an untrained generator mapping. The latent space may include a plurality of latent codes and the untrained generator mapping may use a plurality of parameters to map each latent code to a generated image. A generator pretraining module may be configured to preprocess a first subset of the representative dataset. A quality assessment module may be configured to convert image frames into quantities that assess the degree to which those image frames share characteristic features with image frames in the first subset of the representative data set preprocessed by the generator pretraining module. A generator training module may be configured to modify the untrained generative model to optimize the result of the quality assessment module when applied to the output of the untrained generator mapping, thereby producing a trained generative model comprising the latent space and a trained generator mapping.

A transformation data set may include latent code and generated image frame pairs related by the trained generator mapping. Each pair may be labeled by a plurality of transformation feature labels of the generated image frame. An uncoupled transformation identifier may use a plurality of parameters to transform one or more untransformed latent codes from the latent space of the trained generative model into transformed latent codes. A transformation assessment module may be configured to assess the degree to which the uncoupled transformation identifier produces transformed latent codes, which, when input into the trained generator mapping, produce intended transformations with respect to the plurality of transformation feature labels. A transformation identifier training module may be configured to modify the uncoupled transformation identifier to optimize the result of the transformation assessment module when applied to the output of the uncoupled transformation identifier, thereby producing a generator-coupled transformation identifier.

According to another aspect, a method for editing source images is provided. A representative data set may be derived including a plurality of source images. A trained generative model may be derived from the representative data set. The trained generative model may include a latent space including a plurality of latent codes. One or more of the source images may be mapped to one or more resulting latent codes, wherein the mapping of the one or more resulting latent codes to one or more reconstructed image frames resembles the one or more source images. One or more resulting latent codes may be transformed using one or more generator-coupled transformation identifiers corresponding to one or more intended transformations. The one or more resulting latent codes may be mapped to generated image frames that share at least one characteristic feature with at least one of the source images in the representative data set.

According to another aspect, a system for searching source images using a plurality of search queries is disclosed. A representative data set may include a plurality of source images. A search feature space may include a plurality of search feature codes. A search module may be derived from the representative data set which may be configured to map a collection of source images and a collection of search queries to a subset of the collection of source images that satisfies the requirements specified by the collection of search queries. The search module may include a trained generative model derived from the representative data set. The trained generative model may include a latent space comprising a plurality of latent codes and a trained generator mapping configured to map one or more latent codes to one or more generated image frames that share at least one characteristic feature with at least one of the source images in the representative data set.

A generator-coupled compressor mapping may be configured to map one or more of the source images to one or more resulting latent codes, wherein the trained generator mapping maps the one or more resulting latent codes to one or more reconstructed image frames resembling the one or more source images. One or more generator-coupled search feature identifiers may map latent codes to search feature codes, wherein nearby latent codes are mapped to nearby search feature codes. A filtering module may be configured to select latent codes from collections of latent code and search feature code pairs according to whether the search feature codes satisfy a subset of the collection of search queries.

According to another aspect, a system for producing generator-coupled search feature identifiers corresponding to a search feature space comprising a plurality of search feature codes is disclosed. A representative data set may include a plurality of source images. An untrained generative model may include a a latent space and an untrained generator mapping. The latent space may include a plurality of latent codes. The untrained generator mapping may use a plurality of parameters to map each latent code to a generated image. A generator pretraining module may preprocess a first subset of the representative dataset. A quality assessment module may be configured to convert image frames into quantities that assess the degree to which those image frames share characteristic features with image frames in the first subset of the representative data set preprocessed by the generator pretraining module. A generator training module may be configured to modify the untrained generative model to optimize the result of the quality assessment module when applied to the output of the untrained generator mapping, thereby producing a trained generative model comprising the latent space and a trained generator mapping.

A search feature data set may include latent code and generated image frame pairs related by the trained generator mapping. Each pair may be labeled by a search feature code which contains information about one or more perceptual characteristics of the generated image frame. An uncoupled search feature identifier may use a plurality of parameters to map one or more latent codes from the latent space of the trained generative model to search feature codes, wherein nearby latent codes are mapped to nearby search feature codes. A search feature identifier assessment module may be configured to assess the degree to which the two search feature codes are similar. A search feature identifier training module may be configured to modify the uncoupled search feature identifier to optimize the result of the search feature identifier assessment module when applied to pairs of search feature codes. A first search feature code may be produced by the uncoupled search feature identifier applied to a latent code from the search feature data set. A second search feature code may be a label of the latent code in the search feature data set, thereby producing a generator-coupled search feature identifier.

According to another aspect of the disclosure, a method of searching source images using a plurality of search queries is disclosed. A representative data set may be defined, including a plurality of source images. A search feature space comprising a plurality of search feature codes may be derived. A search module may be derived from the representative data set. A collection of source images and a collection of search queries may be mapped to a subset of the collection of source images that satisfies the requirements specified by the collection of search queries. A trained generative model may be derived from the representative data set. The trained generative model may include a latent space comprising a plurality of latent codes.

One or more of the source images may be mapped to one or more resulting latent codes, wherein the trained generator mapping maps the one or more resulting latent codes to one or more reconstructed image frames resembling the one or more source images. Resulting latent codes may be mapped to search feature codes, wherein nearby latent codes are mapped to nearby search feature codes. Resulting latent codes may be selected from collections of latent code and search feature code pairs according to whether the search feature codes satisfy a subset of the collection of search queries. One or more resulting latent codes may be mapped to one or more generated image frames that share at least one characteristic feature with at least one of the source images in the representative data set.

This has outlined, rather broadly, the features and technical advantages of the present disclosure in order that the detailed description that follows may be better understood.

Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 5A-D depict various flow diagrams depicting a storage system according to one aspect of the present disclosure.

DETAILED DESCRIPTION

Figure 1A:
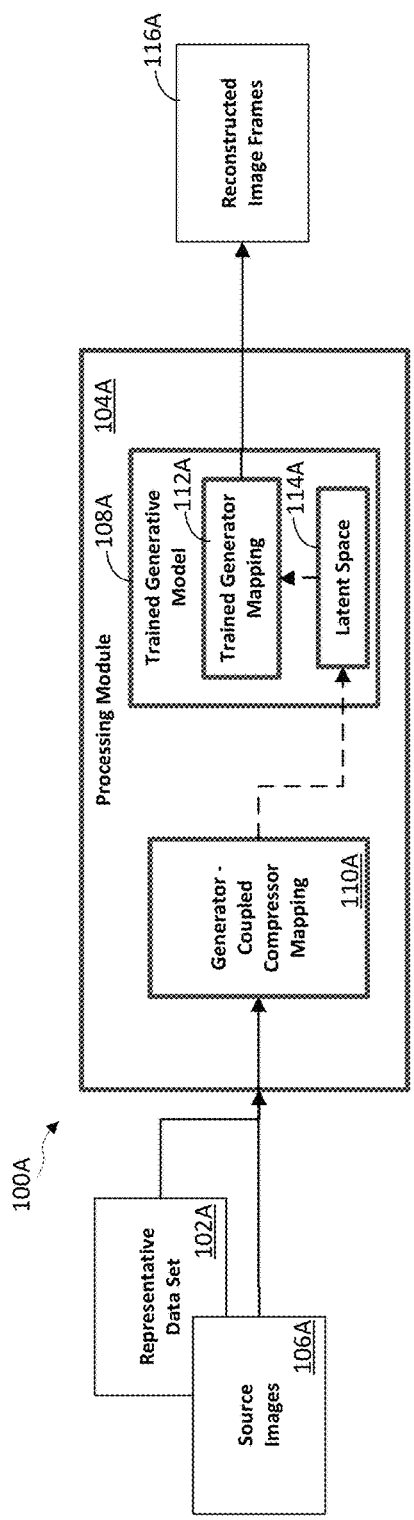
FIG. 1A depicts an image processing system according to aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

The described technology generally relates to systems and methods for viewing, storing, transmitting, searching, and editing application-specific audiovisual content in which edge devices generate such content on the fly from a partial set of instructions, rather than merely accessing the content in its final or near-final form.

According to aspects of the present disclosure, an image processing architecture may include a generative model. The generative model may be, but it is not required to be, a deep learning model as detailed below. According to one aspect, the generative model may include a latent space comprising a plurality of latent codes and a "trained generator mapping". The trained generator mapping may convert points in the latent space to uncompressed data points, which in the case of audiovisual content may be generated image frames. The generative model may be designed, according to one aspect, so that it is capable of closely approximating (up to noise or perceptual error) most or all potential data points in the relevant compression application, which in the case of audiovisual content may be source images.

The image processing architecture may further include a "generator-coupled compressor mapping" which may convert uncompressed data points, which in the case of audiovisual content may be source images, into latent codes. Mapping an uncompressed data point using a generator-coupled compressor mapping and a trained generator mapping in sequence, as described herein, may result in a second uncompressed data point that closely approximates the original (up to perceptual noise). According to one aspect, this mapping process may be performed in real time, or near enough to real-time for the application to successfully execute.

Aspects of the architecture described herein allow conversion back and forth between latent codes and uncompressed data points. This may result in latent codes produced by generator-coupled compressor mappings being stored or transmitted over a network, in place of uncompressed data points. Since latent codes may be thousands of times smaller than the uncompressed data points, this invention leads to increased efficiency in the use of limited storage or network bandwidth resources. The degree of improvement in efficiency may be inversely proportional to the amount of heterogeneity in the model's output. For example, a more perceptually narrow application, such as video conferencing, may lead to superior compression performance in comparison to a broad application such as all possible audiovisual content.

According to one aspect of the present disclosure, a system for processing images, or other unstructured data sets, may include a trained generative model (FIGS. 1,2). Such a model may include at least these three interrelated components: a representative data set, a latent space, and a trained generator mapping derived from the representative data set.

According to one aspect, the representative data set may determine what data will be generated by the trained generative model. The representative data set may be a representative sample of uncompressed data points from the intended application, as measured by perceptual characteristics. The data points generated by the trained generative model may have, pairwise, some perceptual characteristics in common and some perceptual characteristics that vary. The shared perceptual characteristics may be reflected in the parameters and architecture of the trained generator mapping. Information about the perceptual characteristics that vary may be contained in the latent codes.

According to a particular aspect, each data point in the representative data set may be itself very complicated, but there may not be much variation between different data points in the representative data set. A trained generative model based on such a representative data set may then have a very complicated trained generator mapping but also a very small (i.e. low-dimensional) latent space. It is the small size of such a latent space that is responsible for the high compression ratios our approach is able to achieve. However, it may come at the price of more computation and/or specialized hardware requirements for processing.

According to one aspect of the present disclosure, image processing, editing and searching systems may rely on deep learning. With increasing access to both processing power and good data, aspects of the disclosure may build models for data compression without having to manually decide which statistical regularities (features) to take advantage of. A deep learning algorithm may address such decisions. To build a deep learning algorithm, both an architecture and training method must be derived.

According to one aspect, deep learning algorithms may provide a scaffolding that a system can use to write its own compression algorithm. The compression algorithm thus constructed may include, according to one aspect, a series of mathematical transformations. A large trove of data that the computing system can iteratively use to test and modify its algorithm may be provided. The scaffolding may be general enough that the computing system may eventually produce a series of mathematical transformations that encode and decode the data successfully. The space of possible mathematical transformations, however, should be restricted to minimize the risk of making the possible set of rules too broad and unwieldy to ever hit upon anything useful.

For image and video processing, the deep convolutional neural net (CNN) may provide a useful architecture. The mathematical transformations primarily used in a deep CNN are convolutions; the size(s) of these convolutions and the specific architecture of how they fit together must still be decided. The specific parameters of each convolution kernel are what change during training. Deep CNNs provide a core framework behind state-of-the-art results in image classification, segmentation and object identification. This is because the "deep" architecture encodes nested layers of abstraction which may be capable of deconstructing high-level perceptual features into lower level details.

According to one aspect, a deep network may be trained by repeatedly exposing the existing algorithm to data and monitoring to see how it performs. Monitoring may include assessing both how poorly the algorithm is performing (loss function) and deciding what changes may need to be made in each iteration.

Deep learning models are relevant to compression because they may provide a general framework to construct a codec specific to any dataset, including conditional datasets where the space of possibilities is broad, but still significantly smaller than the space of all audiovisual content a human might encounter. These specific codecs may take advantage of increasingly esoteric statistical regularities (features) in the data in which the algorithm may automatically detect which regularities have the best complexity/compression ratio without any human intervention. A compression algorithm may also be designed so that the compressed data stream can be modified based on a set of either pre-selected or learned features. This potentially eliminates the need to decode the data for classification (e.g., search) and modification purposes.

While certain aspects of the disclosure describe the trained generative model as a deep learning model, such as a generative adversarial network (GAN) (FIGS. 6A-B, 7), one of skill in the art will recognize that the systems and methods described herein may be implemented using trained generative models that are not deep learning models. According to one aspect since CNNs have demonstrated unique capabilities to understand qualitative features of images and videos, it may be advantageous to use generative deep learning models as described herein.

When implemented on or across computing systems and devices (FIG. 3), a latent code in the latent space may be described by coordinates, i.e., an ordered list of numbers. This list of coordinates may be referred to as a latent code. Together with the trained generator mapping, a latent code may contain all of the information necessary to produce an uncompressed data point. When the representative data set has relatively little variation, the latent space can be relatively low-dimensional. Therefore, in that case, the number of coordinates used to describe the latent code may be small compared to the size of the corresponding generated data point. It is this small size of the latent code that may be exploited for compression applications.

The size of the latent space may be further reduced using topological data analysis and/or dimensional reduction techniques. For example, audio data and visual data in certain videos may be highly correlated. This correlation may be exploited by conditioning one on the other and discarding the redundant portions of the latent codes.

Figure 1B:
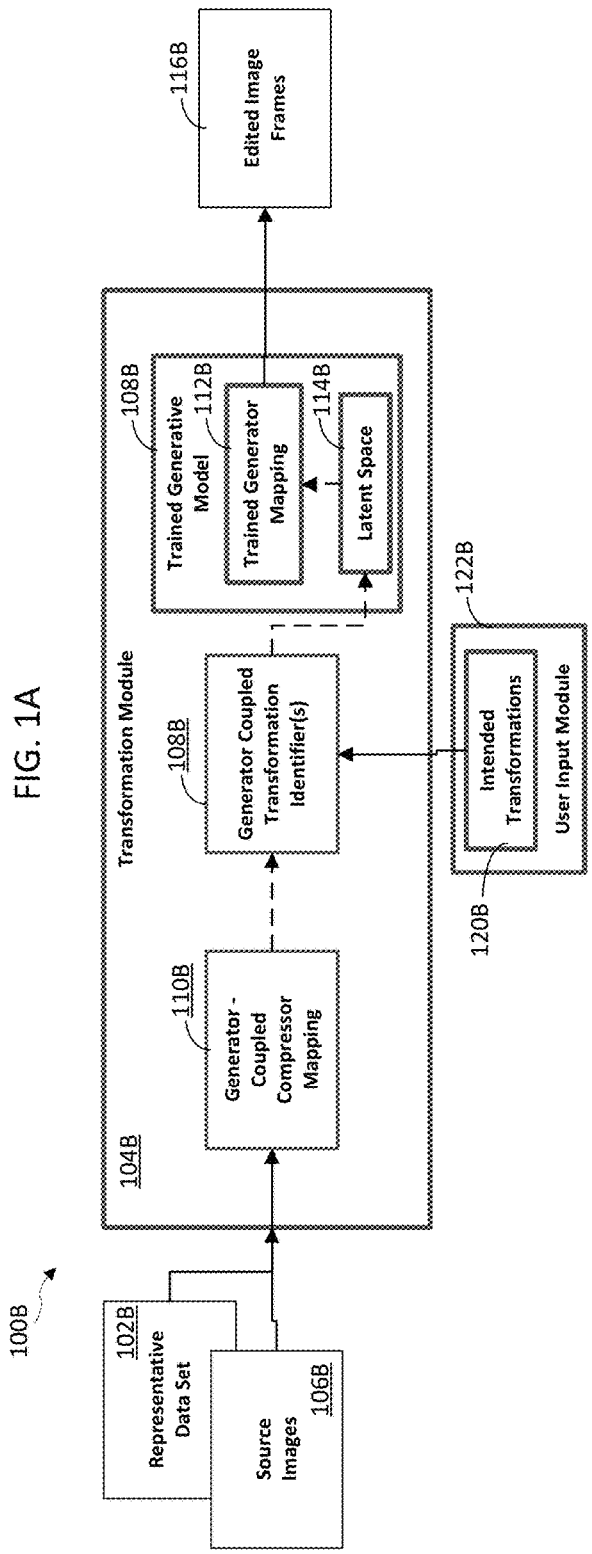
FIG. 1B depicts an image transformation system according to aspects of the present disclosure.
Figure 1C:
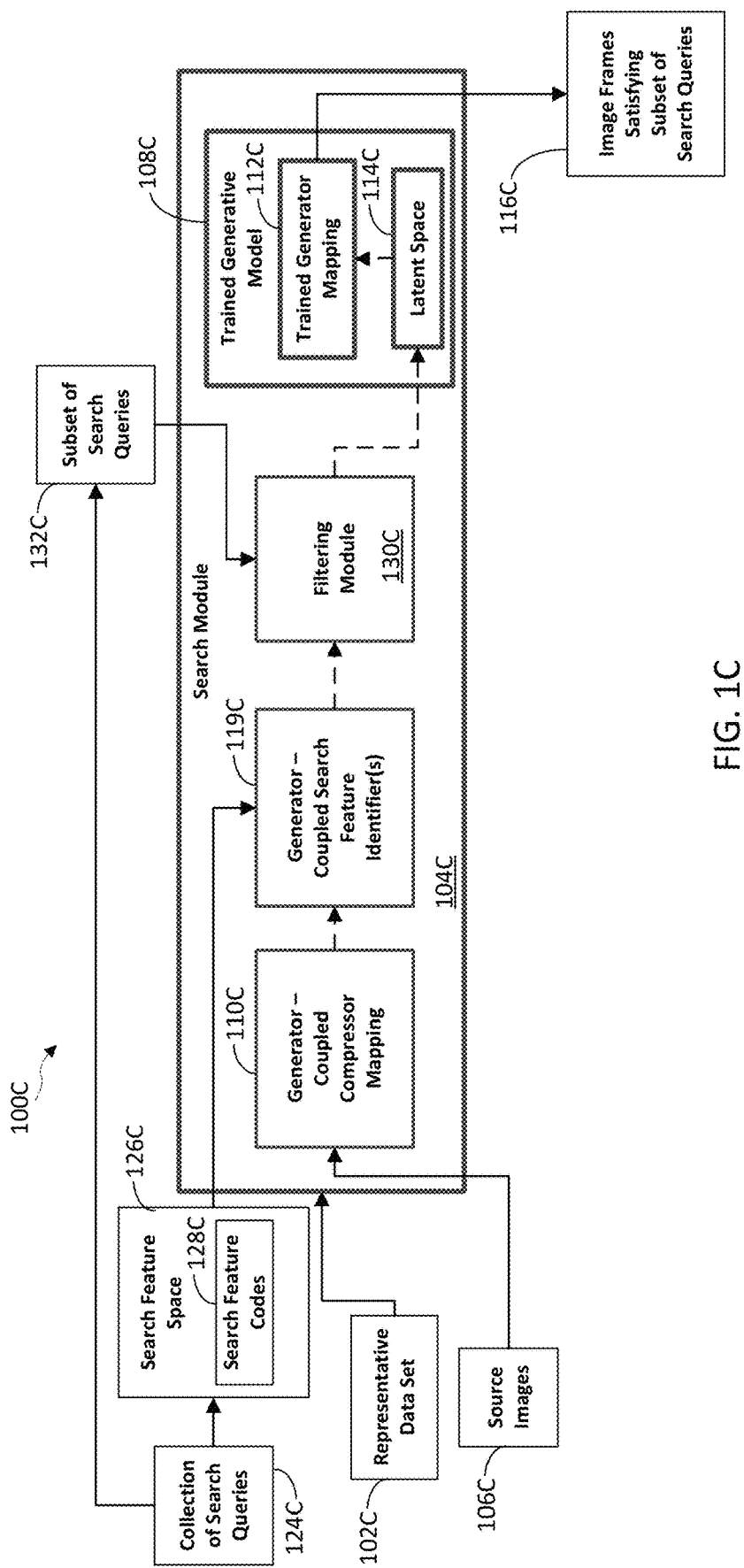
FIG. 1C depicts an image searching system according to aspects of the present disclosure.

More generally, systematic transformations of the latent space may be introduced, which may be applied either for further compression or for effect, e.g., to modify perceptual characteristics of audiovisual content generated from the latent codes (FIGS. 1A-C). These transformations can be applied algorithmically, exploiting the structure and organization of the latent space according to the perceptual characteristics of the corresponding generated data points. This latter capability may lead to resource savings in additional settings, e.g., as an alternative to applying visual effects with CGI.

According to one aspect, a generator-coupled compressor mapping (FIGS. 1A-C, 2A-C) may be provided in addition to the trained generative model. The generator-coupled compressor mapping may be configured such that, when an uncompressed data point is mapped to a latent code by the generator-coupled compressor mapping, and this latent code is then mapped to a reconstructed data point by the trained generator mapping, the reconstructed data point may share perceptual characteristics with the original uncompressed data point, e.g. being nearly indistinguishable to the naked eye/ear. This requirement may be consistent with the lossy nature of the compression algorithm. Moreover, for some practical applications, the generator-coupled compressor mapping may be required to perform at least as well as the trained generator mapping in terms of computation time. Note that the generator-coupled compressor mapping may not be deterministic, i.e., it may stochastically map an uncompressed data point to different latent codes.

To develop a codec using these components, a trained generative model that is suitable for the desired application must be created. As noted above, there may be a direct correlation between the size of the latent code and the degree of variation that may be achieved using this model. Therefore, the ideal representative data set and trained generative model may produce only just enough variation to satisfy the requirements of the desired application. According to one aspect, the trained generator mapping from such a trained generative model and a corresponding generator-coupled compressor mapping may comprise a codec for the desired application.

Figure 3:
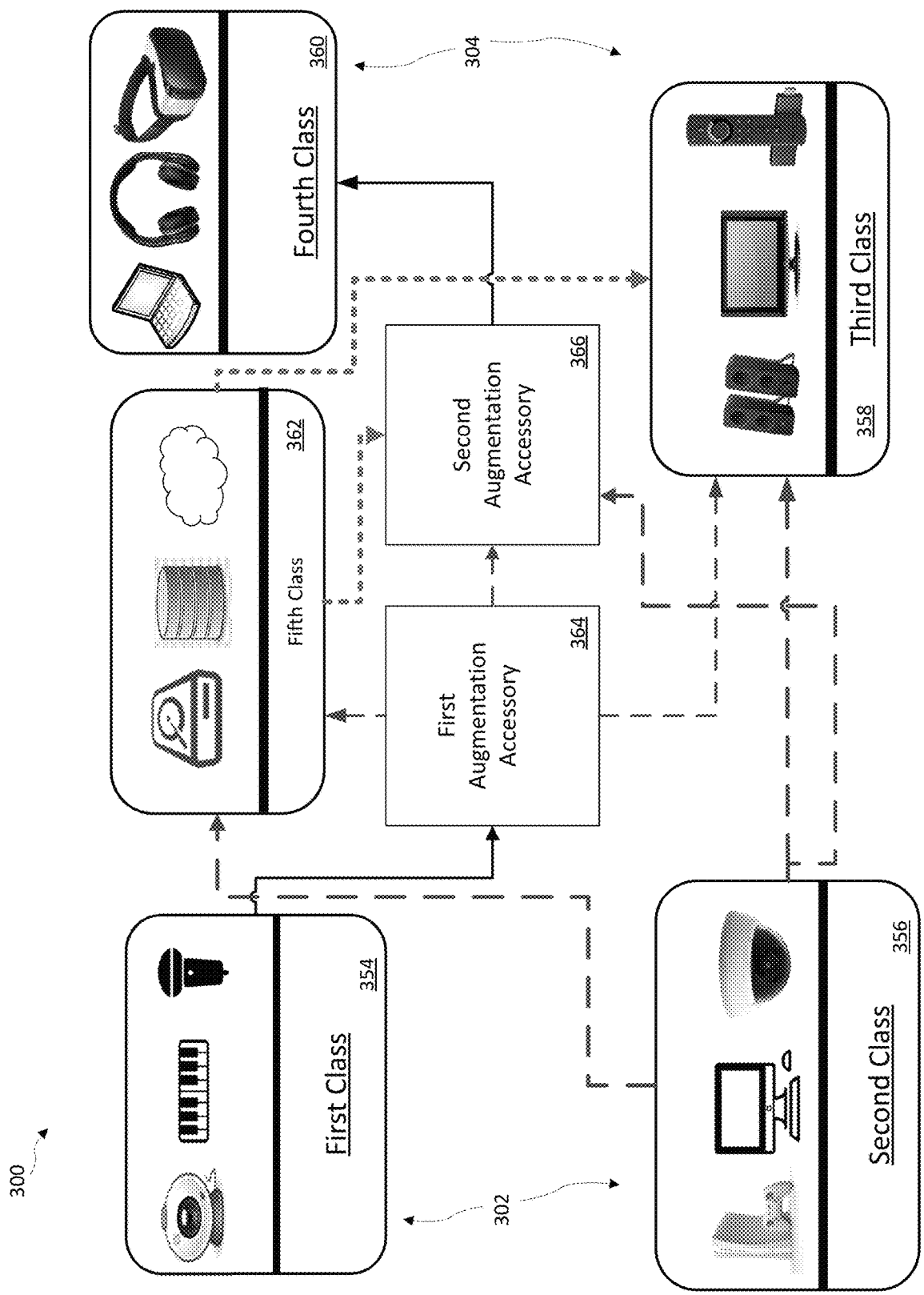
FIG. 3 depicts a deployment of image processing systems according to one aspect of the present disclosure.

According to one aspect of the disclosure, the systems described may also have hardware implications that may go beyond the requirements of standard codecs. In particular, specialized hardware may be required to run the generator-coupled compressor mapping and/or trained generator mapping efficiently. For example, according to one aspect, a graphics processing unit (GPU) or other similar processor architecture capable of efficiently manipulating tensors and/or executing many small computations in parallel (e.g., FPGA, TPU, etc.) may be implemented. This is because inference using neural networks, as done in the preferred variant, involves many small, low-precision calculations. Therefore, any devices running the generator-coupled compressor mapping and/or trained generator mapping must either include specialized hardware or be augmented by an augmentation accessory device with such hardware. Such augmentation accessory devices may comprise additional components of the system (FIG. 3).

According to aspects of the present disclosure, a codec of the type described herein may be configured and used for storage (FIGS. 5A-D) and/or network transmission (FIG. 4) of application-specific audiovisual content. Both uses may involve an input device (camera, microphone, computer, etc.) and an output device (monitor, speaker, computer, etc.), which may be the same device (FIG. 3). The input and output devices may be connected via one or more intermediary devices, and may respectively include copies of the generator-coupled compressor mapping and trained generator mapping, as well as the specialized hardware sufficient to run them. If one or both of these devices do not have sufficient hardware, they may be augmented by an appropriate augmentation accessory device.

According to one aspect, in which the system is configured and implemented for storage (FIGS. 5A-D), a storage device (local, server, cloud, etc.) may be provided. To deposit audiovisual data on the storage device, the raw data may be first fed from the input device into the generator-coupled compressor mapping, which may map it to one or more latent codes. Then, the input device may send the latent codes to the storage device where they are to be stored. To view the original data, the output device may first retrieve the stored latent codes from the storage device. Then, using a trained generator mapping, the output device may map the latent codes to audiovisual data that is perceptually similar to the original audiovisual data. Finally, the output device displays this data for the end user. According to one aspect, systematic transformation(s) of the latent code(s) may occur before storage or after retrieval.

According to one aspect, in which the system is configured and implemented for network transmission (FIG. 4), the raw data may be first fed from the input device into the generator-coupled compressor mapping, which maps it to one or more latent codes. Then, the input device may send the latent codes over the network to the output device. After receiving the latent codes from the input device, the output device, using a trained generator mapping, may map the latent codes to audiovisual data that is perceptually similar to the original audiovisual data. Finally, the output device may display this data for the end user. According to one aspect, systematic transformation(s) of the latent code(s) may occur before or after network transmission.

According to one or more aspects of the disclosure, in storage and network transmission uses, only latent codes are stored and/or transmitted over the network. Given the small size of the latent codes compared to the original data, this may result in a dramatic increase in efficiency in the use of storage and bandwidth resources. This may come at the expense of increased computational requirements. Moreover, in order to achieve high compression ratios, the application should be as narrowly defined as possible so that the latent space is relatively low-dimensional. As mentioned above, another potential improvement to the use of resources is via the systematic transformation of latent codes for effect.

According to one aspect, the network transmission application of the systems described herein also may have implications for security. Since the latent codes have no interpretation without reference to the latent space of the trained generative model they belong to, any third party intercepting signals over this network will not be able to recover the associated audiovisual content. This feature ensures that all signals sent over such a network are private.

Turning now to FIGS. 1A-C, systems for processing (FIG. 1A) editing (FIG. B) and searching (FIG. 1C) source images are depicted, respectively. Each system may comprise a main module (named for its function) and other related components. Each module can exist on one device or have its subcomponents distributed across multiple devices.

FIG. 1A depicts a system for processing source images 100A, according to one aspect of the present disclosure, comprising a representative data set ("RDS") 102 and a processing module 104A. The RDS 102A includes a plurality of source images 106A and is representative in the sense that it comprises a representative sample of uncompressed data points that share one or more perceptual characteristics with other data points sampled directly from the application. The perceptual characteristics may include certain neural network activations or qualitative descriptions and may be assessed computationally or by human inspection. For example, if the given audiovisual application is video conferencing, the RDS 102A may be a plurality of clips sampled directly from recorded video conferences or a plurality of clips with perceptually similar content such as people talking and gesturing into a camera. The perceptual similarity of two images may be quantified by applying an L2 norm to the activations resulting from mapping the two images using a trained image recognition network. A cutoff value for perceptual similarity specific to a given application may be imposed to derive a quantitative definition of perceptual similarity.

Collections of images may be identified as sharing perceptual characteristics if, on average, pairs of images sampled from the collections are perceptually similar with respect to a particular cutoff value. Shared perceptual characteristics may also be assessed by human inspection. In the case of video conference data, data may be selected for inclusion in the RDS 102A based on a human having labeled a video clip as a video conference recording. The RDS 102A may contain the examples spanning the range of variations in perceptual characteristics expected in the given audiovisual application. For example, if the given audiovisual application is video conferencing, the RDS 102A may contain video clips of people with diverse facial features or identities, making a range of gestures, and angling their head in a wide variety of ways. Increasing the range of variations present in the RDS 102A may improve the performance of the system, provided such variations are present in the given application.

According to one aspect, the processing module 104A may be derived from the RDS 102A and is configured to process source images 106A from the intended application which may or may not be elements of the RDS 102A. The processing module 104A comprises a trained generative model 108A and a generator-coupled compressor maping 110A. The trained generative model 108A may be derived from the RDS 102A and may comprise a trained generator mapping 112A and a latent space 114A, the latent space 114A including a plurality of latent codes.

The processing module 104A may take as input one or more source images 106A, which may be input into the generator-coupled compressor mapping 110A, which may map the one or more source images 106A into one or more resulting latent codes in the latent space 114A. The one or more resulting latent codes are then mapped by the trained generator mapping 112A to one or more reconstructed image frames 116A.

According to one aspect, the defining properties of the generator-coupled compressor mapping 110A and the trained generator mapping 112A guarantee that the one or more reconstructed image frames 116A resemble the one or more source images 106A. In particular, the trained generator mapping 112A may map the latent codes to generated image frames that share at least one characteristic feature with the RDS 102A of source images 106A. Resemblance may also be assessed using perceptual similarity metrics, as previously defined. In general terms, the trained generator mapping 112A may turn latent codes into images which look like they may have come from the RDS 102A. In turn, the generator-coupled compressor mapping 110A may map source images 106A to resulting latent codes that the trained generator mapping 112A maps to reconstructed image frames 116A resembling the one or more source images 106A. For a given source image, the generator-coupled compressor mapping 110A may find a latent code from which the trained generator mapping 112A can approximately reproduce the given source image.

According to one aspect, the processing module 104A may be configured for deployment as a compression or encryption codec. In the case that the latent codes comprise fewer bytes than the source images 106A, the processing module 104A may be a compression codec for source images 106A. In the case that the trained generator mapping 112A may be securely distributed to authorized decrypters of source images 106A and the generator-coupled compressor mapping 110A may be securely distributed to authorized encrypters of source images 106A, and they are not distributed elsewhere, the processing module 104A may be an encryption codec for source images 106A.

FIG. 1B depicts a system for editing source images 100B, comprising a RDS 102B and a transformation module 104B, as well as an optional user input module 122B. The RDS 102B is as described above in connection with the system for processing source images 100A. The transformation module 104B may be derived from the RDS 102B and is configured to edit source images 106B from the intended application which may or may not be elements of the RDS 102B. The transformation module 104B may include a trained generative model 108B, one or more generator-coupled transformation identifiers, and a generator-coupled compressor mapping 110B.

According to one aspect, the transformation module 104B may take as input one or more source images 106B, which are input into the generator-coupled compressor mapping 110B, which maps the one or more source images 106B into one or more resulting latent codes in the latent space 114A. The one or more resulting latent codes may then be mapped by generator-coupled transformation identifiers 108B to one or more transformed latent codes in the latent space 114A.

Finally, the one or more transformed latent codes may be mapped by the trained generator mapping 112B to one or more edited image frames 116B.

The trained generative model 108B and the generator-coupled compressor mapping 110B are as described above in connection with the system for processing source images 100A. The generator-coupled transformation identifiers 108B may apply systematic transformations to one or more latent codes. For example, the generator-coupled transformation identifiers 108B may map each input latent code to a transformed latent code equal to a fixed constant latent code plus the input latent code. According to one aspect, the transformation module 104B may be configured to map source images 106B to edited image frames 116B that differ from the source images 106B by some intended transformations 120B, e.g., a predetermined collection of characteristic features. In general terms, the transformation module may edit the characteristic features of each source frame in the same way.

According to one aspect, the system for editing source images 100B may also contain an optional user input module 122B. This module enables a user of the system to select one or more intended transformations 120B of source images 106B. In turn, the user input module 122B may map the one or more intended transformations 120B of source images 106B to the one or more generator-coupled transformation identifiers 108 B that the transformation module uses to implement the intended transformations 120B. In general terms, the user input module 122B may enable a user to select which edits of the source images 106B are implemented by the transformation module.

FIG. 1C depicts a system for searching source images 100C, according to one aspect of the present disclosure. The system for searching source images 100C may use a collection of search queries 124C, an RDS 102C, a search feature space 126C, and a search module 104C. The RDS 102C is as described above in the system for processing source images 100A and system for editing source images 100B. The search feature space 126C may be derived from the collection of search queries 124C and comprises a plurality of search feature codes 128C, the search feature codes 128C either satisfying or not satisfying each query. The search module 104C may be derived from the RDS 102C and may be configured to process source images 106C from the intended application which may or may not be elements of the RDS 102C. The search module 104C may include a trained generative model 108C, one or more generator-coupled search feature identifiers 119C, a filtering module 130C, and a generator-coupled compressor mapping 110C.

According to one aspect, the search module 104C may take as input one or more source images 106C and a subset of the collection of search queries 132C. The one or more source images 106C may be input into the generator-coupled compressor mapping 110C, which maps the one or more source images 106C into one or more resulting latent codes in the latent space 114C. The one or more resulting latent codes then may be mapped by the generator-coupled search feature identifiers 119C to one or more search feature codes 128C in the search feature space 126C. The one or more resulting latent codes paired with the search feature codes 128C then may be mapped by the filtering module 130 C to one or more filtered latent codes. The filtered latent codes may be the latent codes for which the paired search feature codes 128C satisfy the subset of the search queries 132C input into the search module 104C. Finally, the one or more filtered latent codes may be mapped by the trained generator mapping 112C to one or more image frames satisfying the subset of the collection of search queries 116C According to one aspect, the trained generative model and the generator-coupled compressor mapping 110C of the system for searching source images 100C are as described above in the system for processing source images 100A. The defining properties of the generator-coupled search feature identifier 119C and the filtering module 130C guarantee that the one or more reconstructed image frames satisfying the subset of the search queries 116C resemble the one or more input source images whose characteristic features are consistent with the characteristic features described by the subset of search queries 132C. In general terms, for a given collection of source images 106C and search queries 124C, the search module 104C may output only those images satisfying all of the search queries. For example, if source images 124C of people and search queries describing tall, blonde-haired people are input into the search module 104C, the search module may output only those reconstructed images resembling the source images 124C containing tall, blonde-haired people.

Figure 2A:
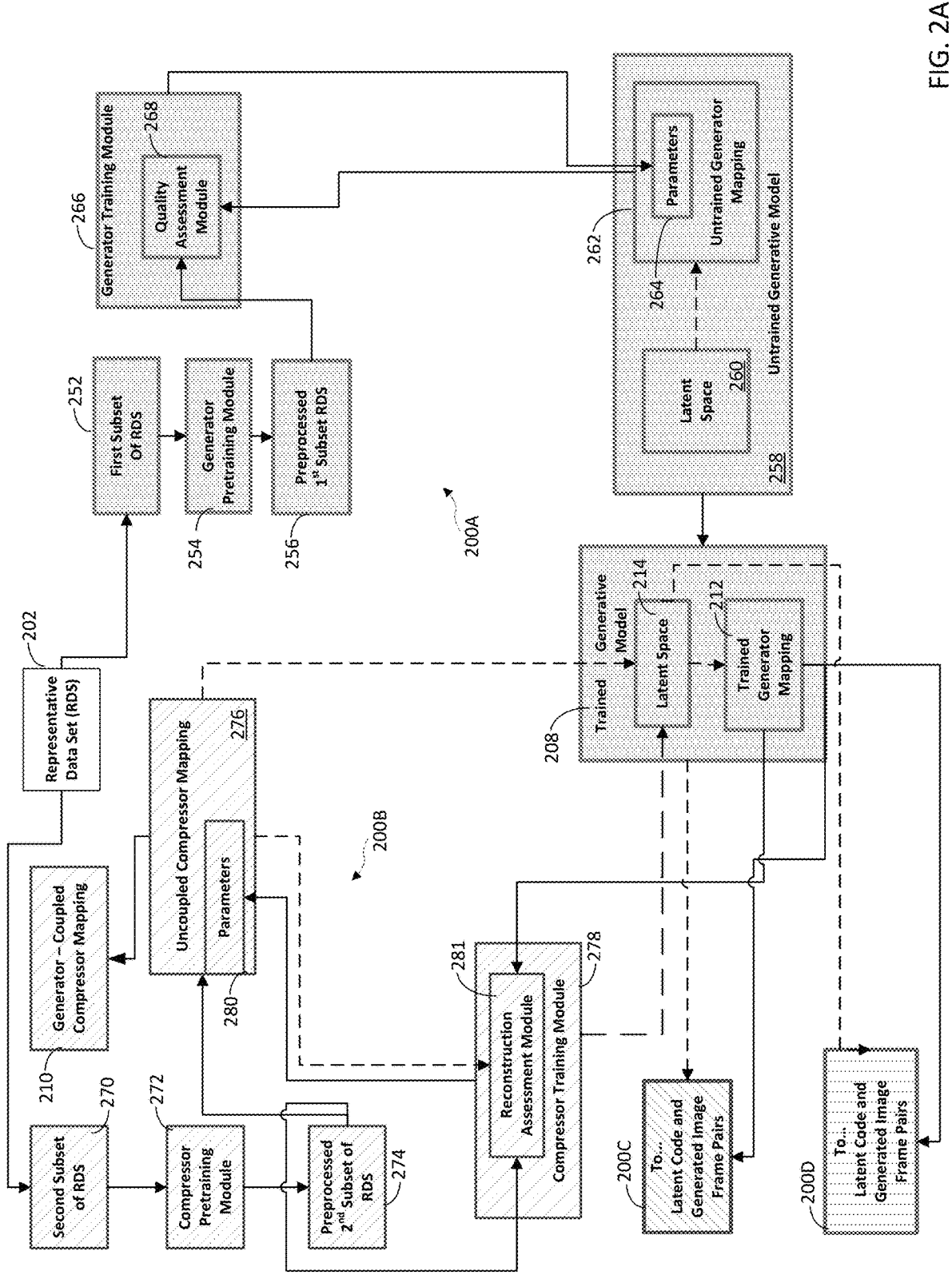
FIG. 2A depicts components of a training system according to aspects of the present disclosure.
Figure 2B:
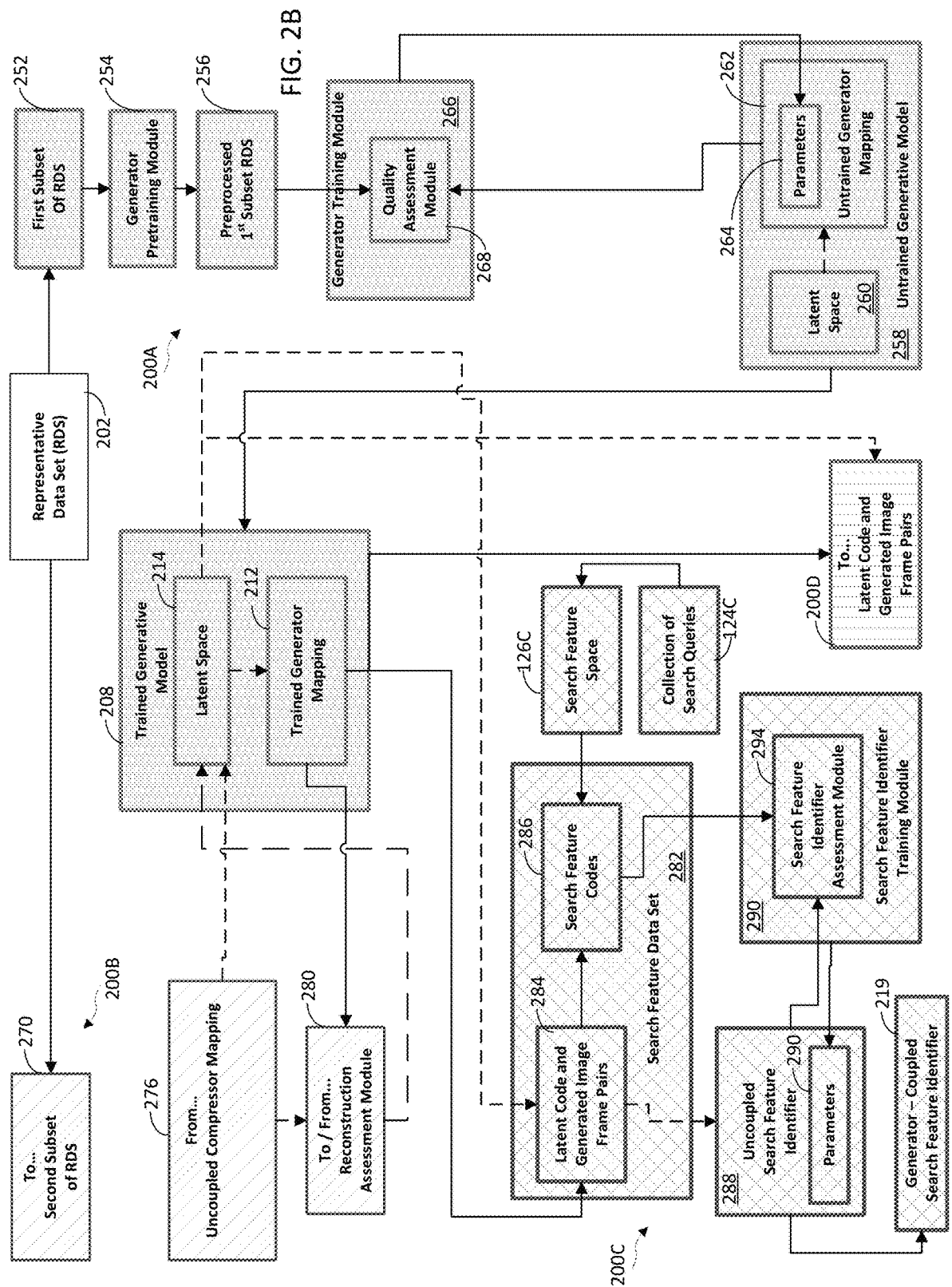
FIG. 2B depicts components of a training system according to aspects of the present disclosure.
Figure 2C:
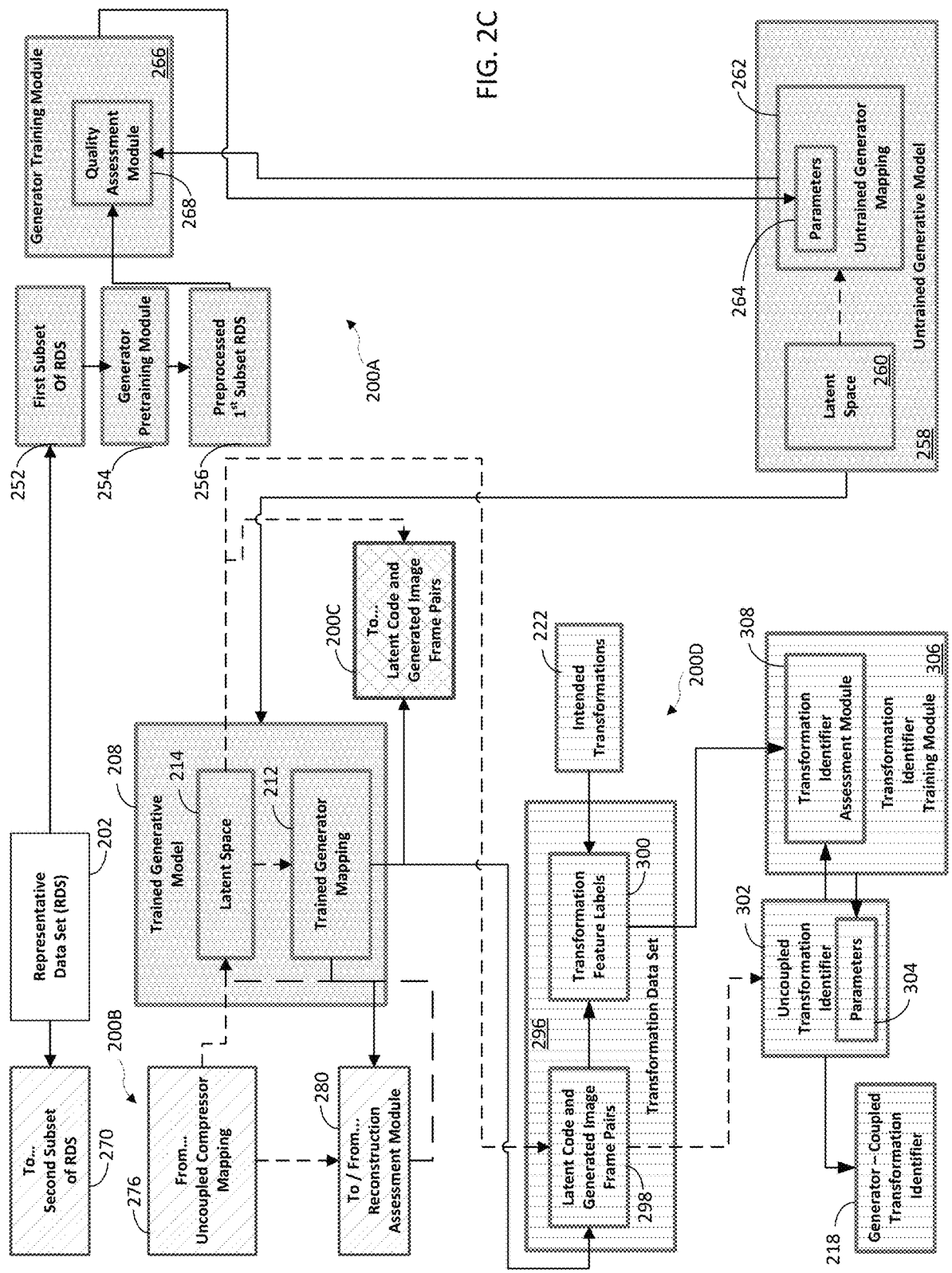
FIG. 2C depicts components of a training system according to aspects of the present disclosure.

Turning now to FIGS. 2A-C, a system for producing generator-coupled components 200 is provided. According to one aspect of the present disclosure, the system for producing generator-coupled components 200 may include, generally, trained generative models 208, generator-coupled compressor mappings 210, generator-coupled transformation identifiers 218, and generator-coupled search feature identifiers 219. The system 200 may include four subsystems, including a subsystem for producing trained generative models 200A, a subsystem for producing generator-coupled compressor mappings 200B, the subsystem for producing generator-coupled search feature identifiers 200C, and the subsystem for producing generator-coupled transformation identifiers 200D.

According to one aspect, an RDS 202 may include a plurality of source images, as previously described herein. The RDS 202 is representative in the sense that it may include a representative sample of uncompressed data points that share one or more perceptual characteristics with other data points sampled directly from the application. For example, the perceptual characteristics may include certain neural network activations or qualitative descriptions, and may be assessed computationally or by human inspection. According to one aspect, if a given audiovisual application is video conferencing, the RDS 202 may be a plurality of clips sampled directly from recorded video conferences or a plurality of clips with perceptually similar content such as people talking and gesturing into a camera. The RDS 202 may contain the examples spanning the range of variations in perceptual characteristics expected in the given audiovisual application. For example, if the given audiovisual application is video conferencing, the RDS 202 will contain video clips of people with diverse facial features or identities, making a range of gestures, and angling their head in a wide variety of ways. Increasing the range of variations present in the RDS 202 may improve the performance of the system, provided such variations are present in the given application.

FIG. 2A depicts, according to one aspect, a subsystem for producing trained generative models 200A. A first subset of the RDS 202, which may be randomly selected from among the plurality of source images comprising the RDS 202, may be pre-processed by the generator pretraining module 254, producing a preprocessed first subset 256 of the RDS 202. This pre-processing may include data type conversion, source image histogram normalization, source image resizing, source image cropping, and data augmentation.

An untrained generative model 258 may include a latent space 260 and an untrained generator mapping 262. The latent space 260 may include a plurality of latent codes, each of which may further include an ordered list of numbers, the length of this list defining the dimension of the latent space. An untrained generator mapping 262 may use a plurality of parameters 264 to map each latent code to a generated image frame.

The generator training module 266 may include a quality assessment ("QA") module 268 configured to convert image frames into quantities that assess the degree to which those image frames share characteristic features with image frames in the preprocessed first subset 256 of the RDS 202.

The generator training module 266 may use the outputs of the QA module 268 to update the parameters 264 of the untrained generator mapping 224 to improve the generated image frames produced by the untrained generator mapping 262, as measured by the QA module 268. This may be done by computing the gradients of the QA module 268 outputs with respect to the parameters of the untrained generator mapping 262 and updating them along the direction of the gradients corresponding to improved output quality. The outcome of this iterative process may be a trained generative model 208, including the latent space 214 and a trained generator mapping 212.

The trained generator mapping 212 may be configured to map latent codes to one or more generated image frames. According to one aspect, the trained generator mapping 212 may be a GAN. The parameters of the trained generator mapping 212, having been derived from the RDS 202, may contain information about the characteristic features that are conserved across the source images in the RDS 202. The latent codes may control the extent to which characteristic features that vary across the source images in the RDS 202 are present in the generated image frames produced by the trained generator mapping 212. The latent codes may control these features in a continuous way, i.e. small changes in input latent codes, as may be measured by an L2 norm or other metric on the latent space, may lead to small changes in the characteristic features of the generated image frames produced by mapping the input latent codes with the trained generator mapping 212, as may be measured by a perceptual similarity metric. In other words, nearby latent codes are mapped by the trained generator mapping to perceptually similar images. Ultimately, the generated image frames may share at least one characteristic feature with at least one of the source images in the RDS 202.

FIG. 2A further depicts a subsystem for producing generator-coupled compressor mappings 200B. A second subset 270 of the RDS 202 may be pre-processed by the compressor pretraining module 272, producing a preprocessed second subset 274 of the RDS 202. This pre-processing may include data type conversion, source image histogram normalization, source image resizing, source image cropping, and data augmentation.

An uncoupled compressor mapping 276 may use a plurality of parameters 280 to map image frames to latent codes belonging to the latent space of a trained generator mapping 212. The uncoupled compressor mapping 276 may map images from the preprocessed second subset 274 of the RDS 202 to resulting latent codes.

A compressor training module 278 may include a reconstruction assessment module 281. The reconstruction assessment module 281 may be configured to convert a source image and latent code pair into a quantity assessing the degree to which the source image resembles the reconstructed image frame produced by mapping the latent code with the trained generator mapping 212. The source image and latent code pairs that are input into the reconstruction assessment module 281 may include images from the preprocessed second subset 274 of the RDS 202 paired with the latent codes obtained by mapping the images with the uncoupled compressor mapping 276.

The compressor training module 278 may use the outputs of the reconstruction assessment module 281 to update the parameters 280 of the uncoupled compressor mapping 276 to improve the latent codes produced by the uncoupled compressor mapping 276, with respect to the outputs of the reconstruction assessment module 281. This may be done by computing the gradients of the reconstruction assessment module 281 outputs with respect to the parameters 280 of the uncoupled compressor mapping 276 and updating the parameters along the direction of the gradients corresponding to improved output quality. The outcome of this iterative process may be a generator-coupled compressor mapping 210.

According to one aspect of the disclosure, the term "generator-coupled" may refer to an essential property of these resulting latent codes. Specifically, the resulting latent codes may have the property that the trained generator mapping 212 maps them to one or more reconstructed image frames resembling the one or more source images to a sufficient degree to support the intended application. In general terms, the generator-coupled compressor mapping 210 may be constructed such that a source image is mapped by the processing module (FIG. 1A) to a reconstructed image frame that resembles the original source image.

FIG. 2B depicts a subsystem for a producing generator-coupled search feature identifier 200C, according to one aspect of the disclosure. A search feature data set 282 may include a collection of latent code and generated image frame pairs 284 and a collection of search feature codes 286. The collection of latent code and generated image frame pairs 284 may be constructed by sampling latent codes from the latent space of a trained generative model 208 and pairing them with the generated image frames produced by mapping the sampled latent codes using the trained generator mapping 212. The collection of search feature codes 286 may be derived from the latent code and generated image frame pairs 284 by labeling the pairs with information about one or more perceptual characteristics of the generated image frame.

An uncoupled search feature identifier 288 may use a plurality of parameters 290 to map one or more latent codes from the latent space of the trained generative model 208 to search feature codes. A search feature identifier training module 290 may include a search feature identifier assessment module 294 that may be configured to assess the degree to which two search feature codes are similar, as may be measured by an L2 norm or other metric on the search feature space.

The search feature identifier training module 290 may modify the uncoupled search feature identifier 288 to optimize the result of the search feature identifier assessment module 294 when applied to pairs of search feature codes. One resulting search feature code may be produced by the uncoupled search feature identifier 288 applied to a latent code from the search feature data set. The other search feature code may be the label of the latent code in the search feature space 226. The outcome of this iterative process may be a generator-coupled search feature identifier 219.

As described previously, the term "generator-coupled" may refer to an essential property of these resulting search feature codes. Specifically, the generator-coupled search feature identifier 219 may be constructed so that it maps nearby latent codes to nearby search features codes. In general terms, the generator-coupled search feature identifier 219 may be capable of identifying features of generated images by examining only the corresponding latent codes, e.g., searching compressed data.

Additionally, according to one aspect, because nearby latent codes may correspond to perceptually similar images when mapped by the trained generator mapping 212, and the search codes are determined based on the perceptual characteristics of images generated by a trained generator mapping 212, a generator-coupled compressor mapping 210 followed by a generator-coupled search feature identifier 219 may map perceptually similar source images to nearby search feature codes.

FIG. 2C depicts a subsystem for producing generator-coupled transformation identifier 200D, according to one aspect of the disclosure. A transformation data set 296 may include a collection of latent code and generated image frame pairs 298 and a collection of transformation feature labels 300. The collection of latent code and generated image frame pairs 298 may be constructed by sampling latent codes from the latent space of a trained generative model 208 and pairing them with the generated image frames produced by mapping the sampled latent codes using the trained generator mapping 212. The collection of transformation feature labels 300 may be derived from the latent code and generated image frame pairs by labeling the pairs with information about one or more perceptual characteristics of the generated image frame.

An uncoupled transformation identifier 302 may use a plurality of parameters 304 to map one or more latent codes from the latent space of the trained generative model 208 to one or more transformed latent codes.

A transformation identifier training module 306 may include a transformation identifier assessment module 308 that is configured to assess the degree to which the uncoupled transformation identifier 302 produces transformed latent codes, which when input into the trained generator mapping 212 may produce intended transformations with respect to the plurality of transformation feature labels.

The transformation identifier training module 306 may modify the uncoupled transformation identifier 302 to optimize the result of the transformation identifier assessment module 308 when applied to the output of the uncoupled transformation identifier 302 and the transformation data set 296. The outcome of this iterative process may be a generator-coupled transformation identifier 218.

As described herein, the term "generator-coupled" may allude to an essential property of these resulting transformed latent codes. Specifically, the transformed latent codes may have the property that the trained generator mapping 212 maps them to one or more generated image frames which implement intended transformations 222 when compared to the generated image frames produced from the original latent codes by the trained generator mapping 212. In general terms, the generator-coupled transformation identifier 218 may be constructed to systematically produce intended transformations 222 in the perceptual features (e.g. versus pixel wise transformations) of generated images by systematically transforming the latent codes which contain information about those features.

Turning now to FIG. 3, a deployment 300 of the systems of FIGS. 1A-C is depicted. In particular, FIG. 3 depicts potential flows of latent codes/search feature codes (dotted arrows) and source images/generated image frames (solid arrows) between exemplary input, output, and storage devices.

Systems configured for storage and network transmission (see FIGS. 4 and 5A-D, respectively) may involve an input device 302 (camera, microphone, computer, etc.) and an output device 304 (monitor, speaker, computer, etc.), which may or may not be the same device. If the input device 302 and output device 304 are different devices, the system may be distributed. The input device 302 and output device 304 may be connected via one or more intermediary devices, and they may respectively contain copies of the generator-coupled compressor mapping and trained generator mapping. Either input device 302 or output device 304 may contain copies of the other components in the processing, transformation, or search modules (FIGS. 1A-C). Either device may also contain sufficient hardware (e.g. a GPU or Internet connection) to run these components. If one or both of these devices do not have sufficient hardware, they must be supplemented by appropriate augmentation accessories, which may either be remote (e.g. cloud-based) or local devices. According to one aspect, such hardware is an optional component of the system.

According to one aspect, deployment of the described systems may span, for example five classes of devices. A first class 354 of input devices may not include the sufficient systems to transform source images or image frames into generated latent codes. Such devices may not be configured with the necessary onboard generator-coupled compressor mapping, a transformation identifier, and/or a search feature identifier. A second class 356 may be configured with sufficient systems to output generated latent codes. That is the devices in the exemplary second class may include devices configured with an onboard generator-coupled compressor mapping, a transformation identifier, and/or a search feature identifier. A third class 358 of devices may include output devices configured with systems to process the generated latent codes (i.e., devices configured with onboard trained generator mappings, transformation identifiers and/or search identifiers). A fourth class 360 of devices may include output devices without the onboard capabilities to process latent codes. A fifth class 362 of devices may include long- and short-term storage devices.

The first class 354 of devices may transmit source images or image frames (solid line) to a first augmentation accessory 364. The first augmentation accessory 364 may include the necessary systems to generate the appropriate latent codes from a generator-coupled compressor mapping, transformation identifier, and/or a search feature identifier. Once the first augmentation accessory 364 processes the images into latent codes, it may transmit such latent codes (dotted lines) to an output device, such as those in the third class 358 or fifth class 362 of devices. Generated latent codes may also be transmitted to a second augmentation accessory 366 configured to process latent codes with trained generator mappings, transformation identifiers, and/or search feature identifiers to create generated image frames. Those generated image frames may then be transmitted to output devices, such as those in the fourth class 360 of devices. While shown in FIG. 3 as separate systems, the first augmentation accessory 364 and the second augmentation accessory 366 may reside on or be the same device or system.

The second class 356 of devices may transmit generated latent codes to the third class 358 and fifth class 362 of devices as those devices are configured with the appropriate systems to store or process latent codes. The second class 356 of devices may also transmit the generated latent codes to the second augmentation accessory 366 for processing of the latent codes.

The fifth class 362 of devices may store the generated latent codes for a short or long term. When requested, the storage devices may then transmit the appropriate latent codes to an output device in the third class 358 of devices or the second augmentation accessory 366 for processing of the latent codes into generated image frames.

Figure 4:
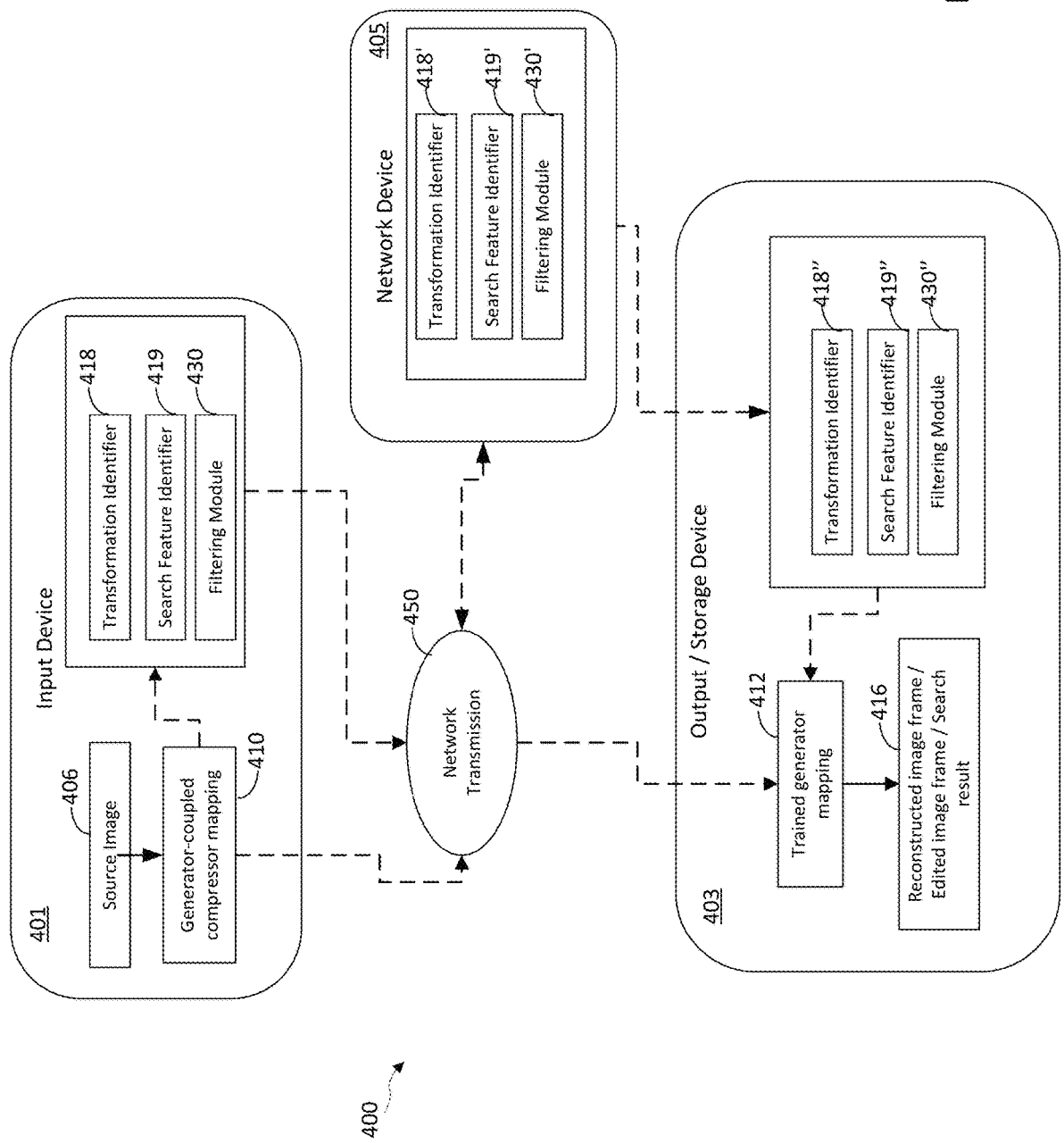
FIG. 4 depicts a network deployment of image processing systems according to one aspect of the present disclosure.

FIG. 4 depicts a network deployment 400 of an image processing system according to one aspect of the present disclosure. An input device 401 that may produce or receive source images 406, which may be an input device as shown in FIG. 3, may use a generator-coupled compressor mapping 410 to map the source image 406 to latent codes. These latent codes may be transmitted over a network 450 without modification. The latent codes may alternatively be modified on the input device 401, an intermediate network device 405, the output/storage device 403, or a combination of these. The latent codes may also be searched on the input device 401, an intermediate network device 405, the output device/storage 403, or a combination of these.

According to one aspect of the disclosure where the latent codes are directly transmitted, the latent codes produced by the input device 401 are transmitted over a network 450 to an output/storage device 403. The output/storage device 403 may use the trained generator mapping 412 to which the generator-coupled compressor mapping 410 on the input device 401 has been coupled to map the latent codes received from the network to reconstruct image frames resembling the source images produced by the input device 401.

According to an aspect of the disclosure where intended transformations are to be applied to the latent codes, a generator-coupled transformation identifier ("transformation identifier") 418 on the input device 401 may be used to map the latent codes produced by the generator-coupled compressor mapping 410 to transformed latent codes. The transformed latent codes are then transmitted over the network 450, where they may be further transformed by a second transformation identifier 418' on a network device 405, before being transmitted over the network to an output device 403. The output device 403 may use a third transformation identifier 418" to further transform the latent codes, before using the trained generator mapping 412 to which the generator-coupled transformation identifiers 418, 418', 418" have been coupled to map the transformed latent codes to edited image frames which reflect the intended transformations associated with the transformation identifiers that have been used to transform the latent codes.

According to an aspect of the disclosure where the latent codes are to be searched, a generator-coupled search feature identifier ("search feature identifier") 419, the network device 405, and/or the output/storage device 403, may be used to map the latent codes produced by the generator-coupled compressor mapping 410 to search feature codes. These search feature codes may be used by a filtering module 430 on the input device 401, or may be transmitted over a network 450 to be used by a filtering module 430', 430" on the network device 405 and/or the output/storage device 403, to produce filtered latent codes satisfying the collections of search queries employed by the filtering modules.

Alternatively, the latent codes from the input device 401 may be transmitted over a network 450 and mapped to search feature codes by a second search feature identifier 419' on the network device 405. These search feature codes may be used by a filtering module 430" on the network device, or may be transmitted over the network to be used by a filtering module 430' on the output/storage device 403, to produce filtered latent codes satisfying the collections of search queries employed by the filtering modules.

Alternatively, the latent codes from the input device 401 may be transmitted over a network 450 to and output/storage device 403 and mapped to search feature codes by a third search feature identifier 419" on the output/storage device 403. These search feature codes may be used by a filtering module 430" on the output/storage device 403 to produce filtered latent codes satisfying the collection of search queries employed by the filtering module.

FIGS. 5A-D depict various flow diagrams depicting a storage system according to one aspect of the present disclosure. Data may be produced by an input device 501, stored on a storage device 505, retrieved from a storage device 505, and displayed on an output device 503.

According to an aspect of the disclosure, where data is to be stored on a storage device 505 in the form of latent codes, an input device 501 that may produce or receive source images 506 uses a generator-coupled compressor mapping 510 to map the source image 506 to latent codes. These latent codes may be stored on a storage device 505 without modification, as shown in FIG. 5B. As shown in FIG. 5A, the latent codes may be modified before being stored on a storage device by a transformation identifier 507, resulting in transformed latent codes 513 being stored on the storage device. The latent codes may also be searched and filtered using a search feature identifier and a filtering module to produce filtered latent codes that are then stored on the storage device.

According to another aspect, as shown in FIG. 5C, latent codes produced by a generator-coupled compressor mapping may be stored on a storage device 505. The trained generator mapping 512 may be used to map the latent codes 515 retrieved from the storage device to generate reconstructed image frames 516 resembling the source images from which the generator-coupled compressor mapping produced the stored latent codes 515.

According to another aspect, as shown in FIG. 5D, latent codes 515 produced by a generator-coupled compressor mapping may be stored on a storage device 505. A generator-coupled transformation identifier ("transformation identifier") 507 may be used to map the latent codes 515 retrieved from the storage device 505 to transformed latent codes. The trained generator mapping 512 may be used to map the transformed latent codes to edited image frames 517 which reflect the intended transformations associated with the transformation identifiers 507 that have been used to transform the latent codes.

Figure 6A:
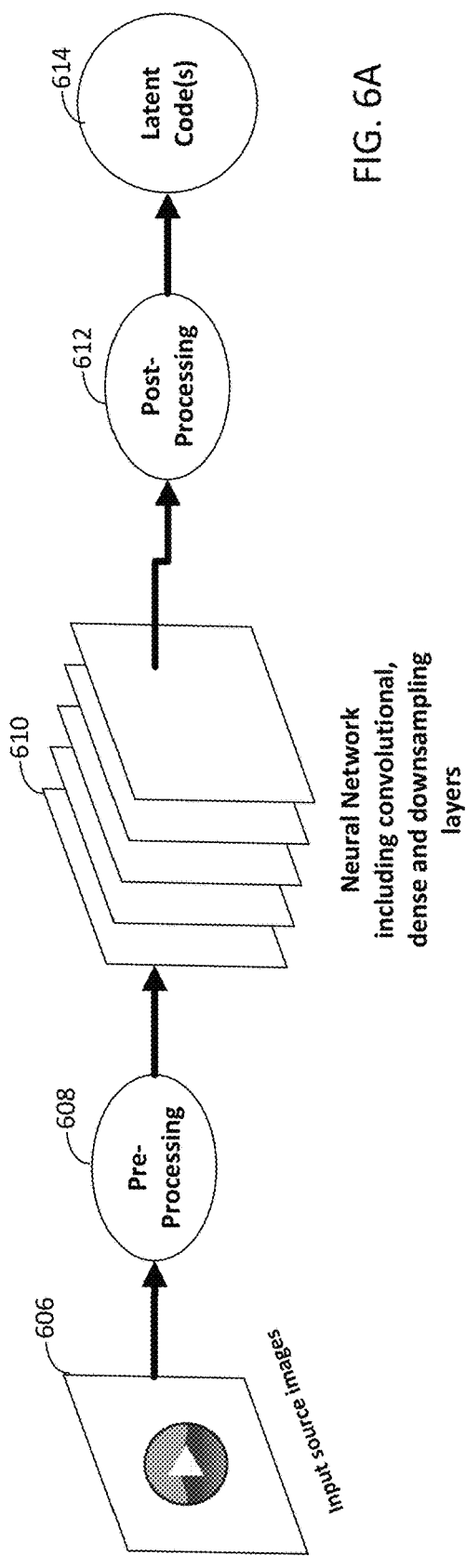
FIGS. 6A-B depict a neural network according to one or more aspects of the present disclosure.
Figure 6B:
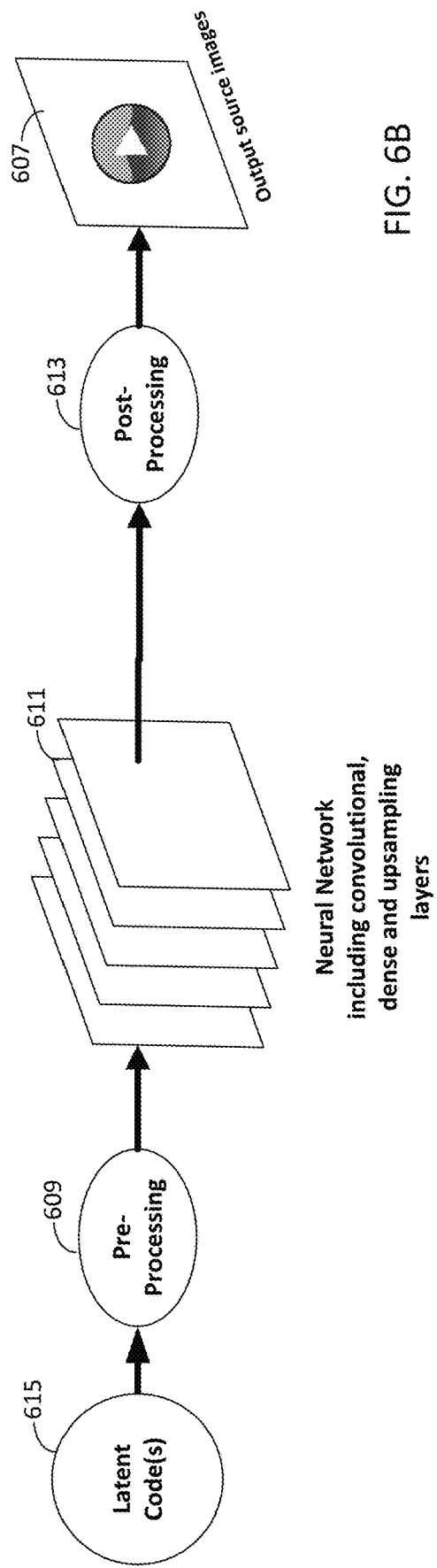

Turning now to FIGS. 6A-B, a neural network is depicted according to one or more aspects of the present disclosure. FIG. 6A-B depict examples of generator-coupled compressor mappings (FIG. 6A) and trained generator mappings (FIG. 6B) with neural network architectures and configured to process video frames.

In a generator-coupled compressor mapping (FIG. 6A), input source images 606 may be preprocessed by a preprocessing module 608, which converts the input source images into an appropriately formatted tensor compatible with the shape of the input layers of the neural network 610. The neural network 610 may comprise a plurality of layers implementing a plurality of parallelizable (i.e. GPU-compatible) operations. These may include convolutional layers, dense layers, activation functions, and downsampling layers. The latent codes may be constructed from combinations of outputs of the plurality of layers comprising the neural network. A postprocessing module 612 may postprocess the latent codes 614 produced by the neural network 610 into an appropriate format for use by other aspects of this invention, e.g., for input into a trained generator mapping or generator-coupled transformation/search feature identifier.

In a trained generator mapping (FIG. 6B), latent codes 615 may be preprocessed by a preprocessing module 609, which converts the latent codes 615 into an appropriately formatted tensor compatible with the shape of the input layers of the neural network 611. The neural network 611 may comprise a plurality of layers implementing a plurality of parallelizable (i.e. GPU-compatible) operations. These may include convolutional layers, dense layers, activation functions, and upsampling layers. The generated image frames may be constructed from combinations of outputs of the plurality of layers comprising the neural network 611. A post-processing module 613 may postprocess the generated image frames produced by the neural network 611 into output source images 607 having an appropriate format for use by other aspects of this invention, e.g., for input into generator-coupled compressor mappings or for display using an output device.

According to one aspect of the present disclosure, an un-trained generator mapping, G is provided. Generally, G may take as input an arbitrary length b batch of latent codes, which are structured as normalized vectors chosen from a z-dimensional standard multivariate normal distribution. This establishes a latent space comprising the unit sphere $S^{z-1}$ in $R^z$, which together with the untrained generator mapping G, comprises an untrained generative model. G may be configured to map latent codes to dimension [b, t, n, m, 3] tensors of unsigned 8-bit integers. These tensors may be interpreted as a batch of RGB videos with resolution n×m and t frames.

According to one aspect, at the base of G are tensors of identical shape for each frame that change throughout the training process. Each block may begin with a convolutional gated recurrent unit (CGRU) for each frame. The CGRUs allow the generator to learn temporal dependencies between frames and are unrolled once per frame. After the CGRU there are two convolutional layers per frame in each block. Upsampling may be done between each block.

The inputs to G may interact with each block after the convolutional layers. G takes as input a z-dimensional latent code sampled from the standard z-dimensional multivariate normal distribution. This input is then sent to a dense neural network where the width of each layer is z. The output of this dense layer may be passed to affine transformations specific to both sets of convolutional layers in each block. The output ($a\_\{i,j\}$) of each of these affine transformations has dimension [f, k], where f is the number of feature maps of the associated convolutional layer, and k is the number of moments to be modified by each affine transformation. The output of the convolutional layers may be modified using the output of the associated affine transformation by modifying the first k moments of the ith feature to be equal to $a\_\{i,1\}$, ..., $a\_\{i,k\}$.

The blocks comprising G include layers that add noise inputs scaled by learned per-feature-map constants to intermediate activations. These additions may allow for the generation of stochastic detail in the output of G. At the end of all the blocks, there is a post-processing layer which may be a 1×1 convolutional layer that causes G to output three channel (RGB) frames of the desired resolution.

According to one aspect of the present disclosure, the systems described herein may be implemented as a video conferencing application, which may be considered a special case of the network transmission use case. It should be noted, however, that there are also many other applications to streaming/broadcasting, communications, and any setting where audiovisual data is transmitted and/or stored in which the systems described may be implemented.

According to one aspect, the input and output devices may both contain, either internally or as accessories, a video camera, display/screen, microphone, speakers, and a processor capable of running both the generator-coupled compressor mapping and trained generator mapping with sufficient speed to enable a real-time video conference. Additionally, both the input and output devices may contain and run both the generator-coupled compressor mapping and the trained generator mapping.

A user of the input device may face the camera and speak into the microphone of that device. The corresponding audio and video feeds may be fed through the input device's generator-coupled compressor mapping and converted into latent codes. The latent codes are, in turn, transmitted to the output device over the network, possibly after applying a systematic transformation for further compression or effect, e.g., to change the appearance of the input device's user while preserving their pose and expression.

Upon receiving the latent codes from the input device, the output device may then apply a systematic transformation to them. The resulting latent codes are fed through the output device's trained generator mapping and converted back into audiovisual data with sufficient speed to enable a real-time video conference. This data is subsequently displayed on the screen and speakers of the output device for its user to view.

According to one aspect, the input and output devices may be interchangeable, and both users may be transmitting to each other simultaneously. This application also may accommodate video conferences with more than two parties, so that each device is simultaneously transmitting to and receiving from all other devices participating in the video conference.

According to one aspect, the exemplary model may take advantage of certain traits of video conferencing footage generally to achieve a high compression ratio. In one aspect, the video data has no edits, i.e., video comprises a single shot with little or no camera movement or cuts. Additionally, the video data is largely of the same person or people facing a camera at varying distances. In another aspect, a perceptually accurate reconstruction depends more on accurately reconstructing the facial expressions and micro-expressions of the people as opposed to the background. Also, the conditional distribution for a video clip given the associated audio data may be much tighter here than in general. In other words, having the relevant audio data dramatically reduces the number of possibilities for what might be on screen. And, the generator-coupled compressor mapping may operate with sufficient speed to enable a real-time video conference. Real-time processing algorithms are typically very limited in the statistical regularities they can exploit because these algorithms do not look for long term temporal dependencies. This problem may be eliminated by creating the trained generative model in advance, using a RDS.

These properties may allow for the ability to approximate a large range of video-conferencing-specific content using models trained on hardware. The lack of edits and the association with audio data also ensures that there are powerful statistical regularities with respect to motion and changing expression that can be exploited.

According to one aspect, it is thus possible to build a generative model that can construct clips of people speaking into a camera from a much simpler and dimensionally-reduced latent space. The RDS for this model may include clips of people speaking into a camera at varying distances. The clips may be of a fixed resolution, have a fixed number of frames, and must also have the associated audio data. A plurality of such clips may be needed in the dataset to prevent overfitting.

A model may be built with this data using a GAN architecture. While the visual component of this codec is described here, a GAN may also be constructed for compression of audio data containing only speech using a similar methodology. The model may be trained beginning with an untrained generator mapping (G), and a generator quality assessment module, which includes a critic (C). The latter's outputs may be a weighted sum of two distinct pieces; one to check for temporal consistency ($C_t$) and the other for individual frame quality ($C_f$). G may take as input an arbitrary length-b batch of latent codes, which are structured as normalized vectors chosen from the z-dimensional standard multivariate normal distribution. This establishes a latent space comprising the unit sphere $S^{z-1}$ in $R^z$, which when coupled with the untrained generator mapping G, comprises an untrained generative model. G is configured to map latent codes to dimension [b, t, n, m, 3] tensors of unsigned 8-bit integers. These tensors may be interpreted as a batch of RGB videos with resolution n×m and t frames. $C_f$ may take as input a [b, n, m, 3] tensor constructed from the output of G by randomly selecting a value of t for each value of b, i.e., by randomly selecting a frame from a batch of n×m video clips from the population, each with t-frames. $C_t$ takes as input a [b, t, n/d, m/d, 3] tensor constructed by downsampling (by average pooling) either the output of G or a batch of real video clips from the RDS. The downsampling is so that the size of $C_t$ remains manageable and comparable to the size of $C_f$.

C may be configured to output a weighted sum of $C_t$ and $C_f$, both of which are configured to output numbers. C may take as input a [b, t, n, m, 3] tensor converted to an input of both C t and $C_f$. The input of C can either be an output of G or a tensor constructed from a batch of video clips from the RDS.

The generator training module for G may train this model progressively; i.e. all of G, $C_f$, and $C_t$ are neural networks and may be grown block by block. According to one aspect, "block" may be defined for each of G, $C_f$, and $C_t$ when their structure may be discussed in detail. Blocks may comprise a plurality of dense, recurrent, or convolutional neural network layers.

According to one aspect, in progressive training, the smallest possible version of the model (one that outputs/inputs lowest resolution clips, usually 8×8) may be trained to satisfaction, then a convex combination of the next block may be added so that the relative weight of the new block is iteratively interpolated between 0 and 1 during each training step. The model with the fully weighted new block is trained to satisfaction. The new block may contain upsampling layers so that the output has now doubled in resolution. This may continue inductively until the output has the desired resolution. All hyperparameters may be modified manually when each new block is added, and any resolution-specific post-processing (in G) and preprocessing (in $C_t$ and $C_f$) must be trained from scratch when taking convex combinations with a new block is started. Resolution-specific post-processing layers for lower resolutions may no longer be used when a new layer is incorporated in the model.

During training, the generator training module may modify G and C alternately, and this optimization may be viewed as a zero-sum game. In other words, G is tasked with producing outputs that have high scores from C, and C is tasked with assigning high scores to data from the RDS, and low scores to the outputs of G. This iterative optimization process, leads to a situation where neither G nor C can improve unilaterally (a Nash equilibrium). In practice, this may lead to the output of G being video clips which share one or more characteristic features with those in the RDS. Since the system is training progressively, a Nash equilibrium may be found for each resolution before adding the next block. The generator quality assessment module may additionally comprise a logistic non-saturating loss applied to the untrained generator mapping's ability to produce video clips that the critic cannot distinguish from those in the RDS, as measured by the output of the critic. The generator training module may additionally comprise a logistic non-saturating loss applied to the critic's ability to distinguish video clips produced by the untrained generator mapping from those in the RDS, as measured by the output of the critic. The generator training module may additionally impose R1 regularization on the critic gradients during training.

According to one aspect, $C_f$ may start with a 1×1 convolutional layer that accepts input frames with three channels (RGB). Each block of $C_f$ may consists of two convolutional layers, with downsampling between each block. $C_t$ may be similar to $C_f$ except that three-dimensional convolutions may be used in the blocks instead of two-dimensional convolutions.

Once trained, the untrained generator mapping of the untrained generative model may become a trained generator mapping, since it maps latent codes to short clips of people talking to the camera, thus creating a trained generative model. An analogous compressor training module may be constructed to progressively train a generator-coupled compressor mapping E so that given a video clip V, E(V) is a latent vector, and G(E(V)) may be perceptually similar to V. The generator-coupled compressor mapping may be a progressively trained feed-forward network whose forward-pass computation involves sufficiently few calculations such that can map video conference frames to latent codes in real time. The generator-coupled compressor mapping also may condition video inputs on associated audio data to improve the quality of latent codes produced by E. According to one aspect, the audio latent codes may be sent over the network separately.

Systematic transformations of transmitted data can be performed by a generator-coupled transformation identifier before, after, or during transmission of the latent codes from the generator-coupled compressor mapping to the trained generator mapping via a network. To perform a systematic transformation after latent code transmission, the transformed latent codes being sent to affine transformations for each block in G are considered, and some of them are replaced (or taken linear transformations thereof) with transformed latent codes that correspond to the desired systematic transformations.

Figure 7:
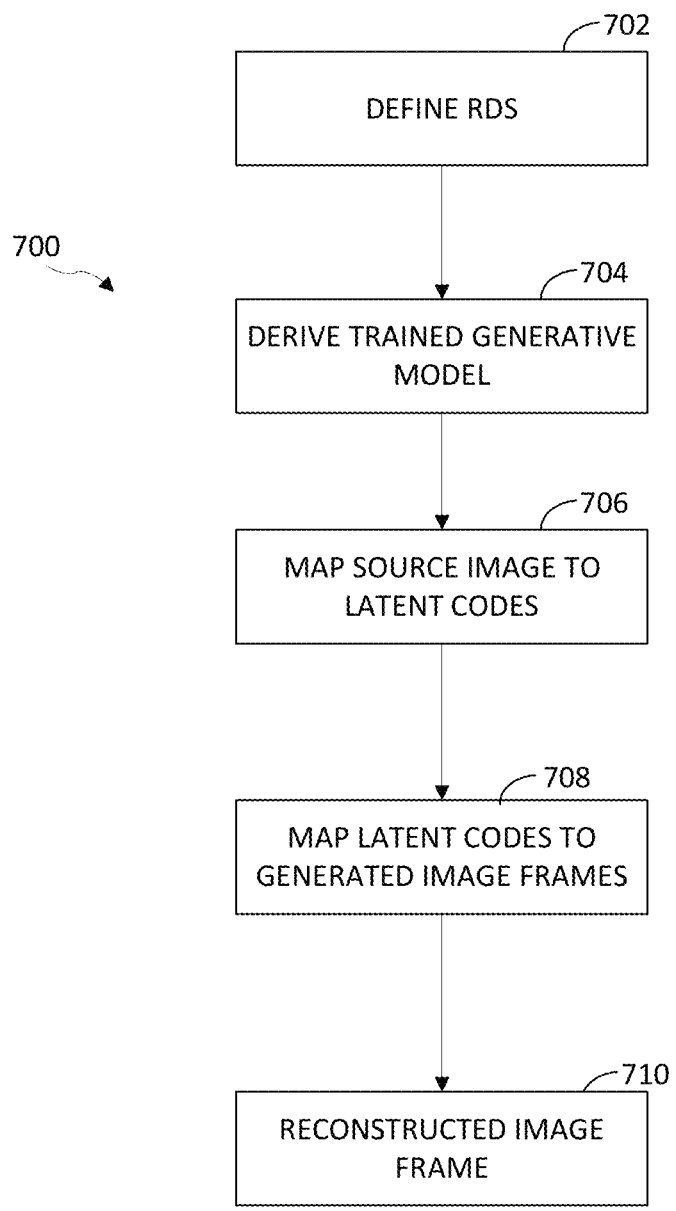
FIG. 7 depicts a method of processing an image according to one or more aspects of the present disclosure.

FIG. 7 depicts a method 700 of processing an image according to one or more aspects of the present disclosure. As shown in block 702 a RDS may be defined. As described herein the RDS may include a plurality of source images. As shown in block 704 a trained generative model may be derived from the RDS. According to one aspect, the trained generative model may include a latent space with a plurality of latent codes. As shown in block 706, one or more of the source images may be mapped by a generator-coupled compressor mapping to one or more resulting latent codes. As described herein, the trained generator mapping may be configured such that the mapping of the one or more resulting latent codes to one or more reconstructed image frames resembles the one or more source images. As shown in block 708, one or more latent codes may be mapped by a trained generator mapping to one or more generated image frames. As described herein the generated image frames may share at least one characteristic feature with at least one of the source images in the RDS. As shown in block 710, the result of the processing is a reconstructed image frame that is perceptually similar to the original source image.

Figure 8:
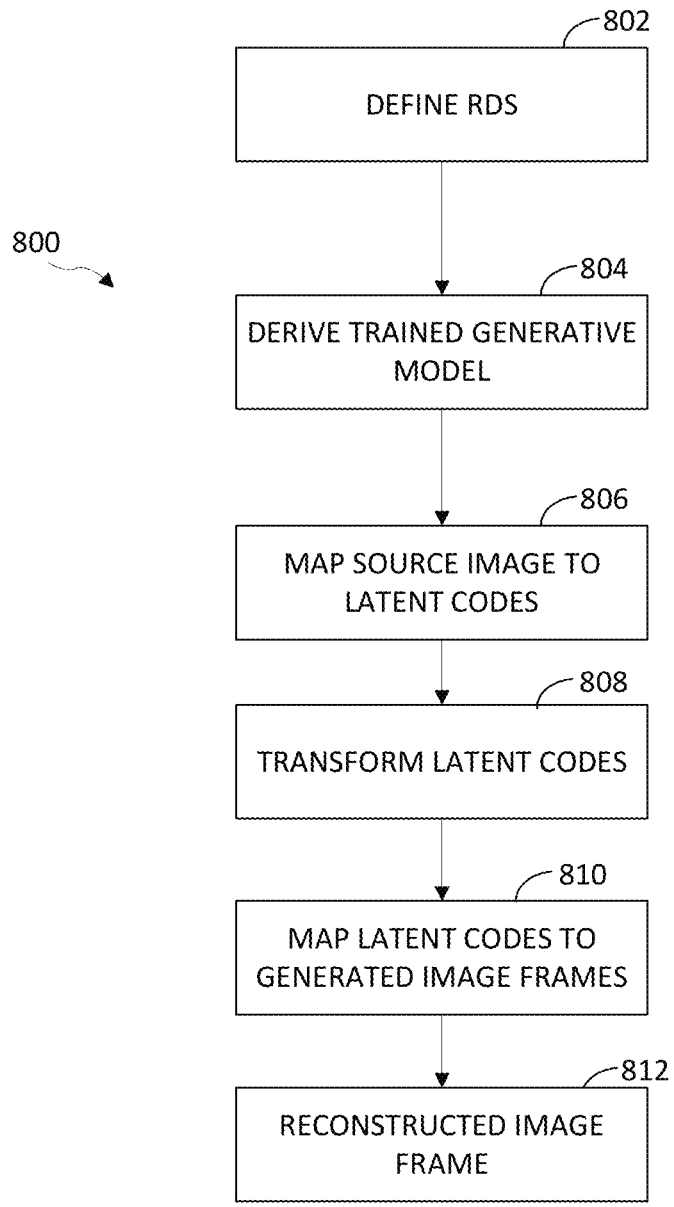
FIG. 8 depicts a method of editing an image according to one or more aspects of the present disclosure.

FIG. 8 depicts a method 800 of editing an image according to one or more aspects of the present disclosure. As shown in block 802 an RDS may be defined. As described herein the RDS may including a plurality of source images. As shown in block 804 a trained generative model may be derived from the RDS. According to one aspect, the trained generative model may include a latent space with a plurality of latent codes. As shown in block 806, one or more of the source images may be mapped by a generator-coupled compressor mapping to one or more resulting latent codes. As described herein, the trained generator mapping may be configured such that the mapping of the one or more resulting latent codes to one or more reconstructed image frames resembles the one or more source images. As shown in block 808, one or more resulting latent codes may be transformed using one or more generator-coupled transformation identifiers corresponding to one or more intended transformations of an output of the trained generator mapping. As shown in block 810, one or more resulting latent codes may be mapped by a trained generator mapping to one or more generated image frames. As described herein the generated image frames may share at least one characteristic feature with at least one of the source images in the RDS. As shown in block 812, the result of the processing is a reconstructed image frame that is perceptually similar to the original source image.

Figure 9:
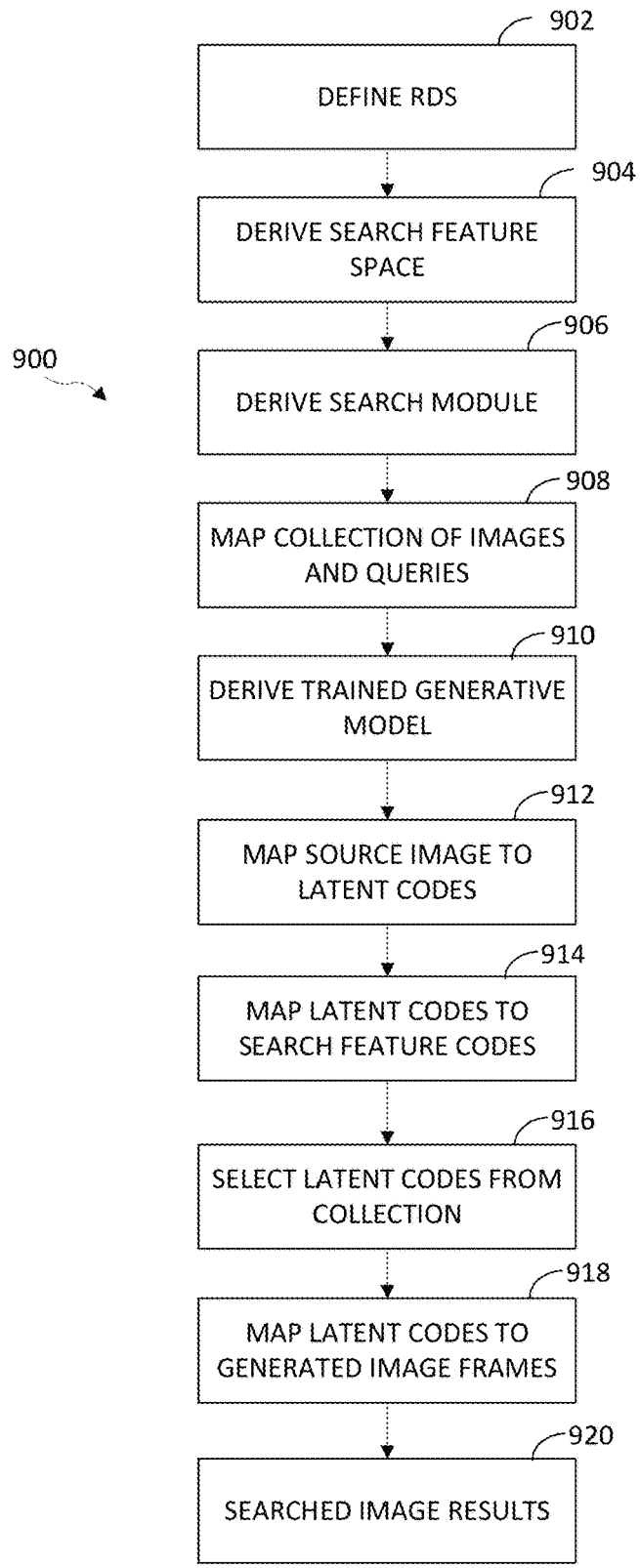
FIG. 9 depicts a method of searching an image according to one or more aspects of the present disclosure.

FIG. 9 depicts a method 900 of searching an image according to one or more aspects of the present disclosure. As shown in block 902 an RDS may be defined. As described herein the RDS may including a plurality of source images. As shown in block 904 a search feature space may be derived, as described herein. The search feature space may include a plurality of search feature codes. As shown in block 906 a search module may be derived from the RDS as described herein. In block 908, a collection of source images and a collection of search queries may be mapped to a subset of the collection of source images. The subset of the collection of source images may satisfy the requirements specified by the collection of search queries.

As shown in block 910, a trained generative model may be derived from the RDS. According to one aspect, the trained generative model may include a latent space with a plurality of latent codes. As shown in block 912, one or more of the source images may be mapped by a generator-coupled compressor mapping to one or more resulting latent codes. As described herein, the trained generator mapping may be configured such that the mapping of the one or more resulting latent codes to one or more reconstructed image frames resembles the one or more source images.

As shown in block 914, the resulting latent codes may be mapped to search feature codes. According to one aspect, nearby latent codes may be mapped to nearby search feature codes. As shown in block 916 resulting latent codes may be selected from collections of latent code and search feature code pairs according to whether the search feature codes satisfy a subset of the collection of search queries. As shown in block 918, one or more resulting latent codes may be mapped by a trained generator mapping to one or more generated image frames. As described herein the generated image frames may share at least one characteristic feature with at least one of the source images in the RDS. As shown in block 920 the exemplary method outputs image frames satisfying the subset of search queries.

While aspects of the present disclosure describe and detail the processing, editing, and searching of audiovisual data, one skilled in the art will recognize that such data is merely an example of the types of data suitable for processing by the systems described herein. One of skill in the art will further recognize that any unstructured data may be processed according to, and using, the systems disclosed herein without deviating from the scope of the present disclosure.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computing system. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A system for processing source audiovisual data, the system comprising:
   a representative data set including a plurality of source audiovisual files;
   a processing module configured to process source audiovisual files and derived from the representative data set, the processing module comprising:
   a trained generative model, the trained generative model comprising:
   a plurality of latent spaces, each comprising a plurality of latent codes;
   a plurality of trained generator mappings, each configured to map respective latent codes to one or more generated audiovisual clips that share at least one characteristic feature with at least one of the source audiovisual files in the representative data set; and
   a generator-coupled compressor mapping configured to map one or more of the source audiovisual files to one or more resulting latent codes, wherein the plurality of trained generator mappings map the one or more resulting latent codes to one or more reconstructed audiovisual clips resembling the one or more source audiovisual files.

2. The system of claim 1 wherein the plurality of source audiovisual files comprises a plurality of source images of a plurality of faces.

3. The system of claim 1 wherein the plurality of source audiovisual files comprises a plurality of source images of a plurality of bodies.

4. The system of claim 1 wherein the plurality of source audiovisual files comprises a plurality of video frames from a plurality of security camera recordings.

5. The system of claim 1 wherein the plurality of source audiovisual files comprises a plurality of video frames from a plurality of recorded video conferences.

6. The system of claim 1 wherein a subset of the plurality of latent codes is stored in a distributed database.

7. The system of claim 1 wherein the source audiovisual files comprise a live video stream, wherein the plurality of trained generator mappings of the one or more resulting latent codes to one or more reconstructed audiovisual clips is isochronal with the live video stream.

8. The system of claim 1 wherein trained-generator mappings and the generator-coupled compressor mappings are further configured to map in real-time.

9. The system of claim 1 wherein the plurality of source audiovisual files comprises computer-generated audiovisual files.

10. A system for processing source audio, the system comprising:
    a representative data set including a plurality of source audio files;
    a processing module configured to process source audio files and derived from the representative data set, the processing module comprising:
    a trained generative model, the trained generative model comprising:
    a latent space comprising a plurality of latent codes;
    a trained generator mapping configured to map latent codes to one or more generated audio clips that share at least one characteristic feature with at least one of the source audio files in the representative data set; and
    a generator-coupled compressor mapping configured to map one or more of the source audio files to one or more resulting latent codes, wherein the trained generator mapping maps the one or more resulting latent codes to one or more reconstructed audio clips resembling the one or more audio files.

11. The system of claim 10, wherein a number of bytes comprising a latent code is less than or equal to the number of bytes comprising each of the source audio files.

12. The system of claim 10, wherein copies of the trained generator mapping are securely transmitted to authorized decrypters of source audio files.

13. The system of claim 10, wherein copies of the generator-coupled compressor mapping are securely transmitted to authorized encrypters of source audio files.

14. The system of claim 10 wherein the trained generator mapping maps nearby latent codes to perceptually similar audio clips.

15. A method for processing source audio files, the method comprising:
    defining a representative data set including a plurality of source audio files;
    deriving a trained generative model from the representative data set, the trained generative model comprising a latent space including a plurality of latent codes;
    mapping one or more latent codes to one or more generated audio clips that share at least one characteristic feature with at least one of the source audio files in the representative data set; and
    mapping one or more of the source audio files to one or more resulting latent codes, wherein the mapping of the one or more resulting latent codes to one or more reconstructed audio clips resembles the at least one of the source audio files.

16. The method of claim 15 wherein the mapping of the one or more latent codes is mapped by a trained generator mapping.

17. The method of claim 16 wherein the mapping of the at least one source audio files is mapped by a generator-coupled compressor mapping.

18. The method of claim 17, further comprising transmitting secure copies of the trained generator mapping and the generator-coupled compressor mapping to authorized decrypters of source audio files.

19. The method of claim 15, wherein a number of bytes comprising a latent code is less than or equal to the number of bytes comprising each of the source audio files.

20. The method of claim 15 further comprising mapping nearby latent codes to perceptually similar audio clips.

* * * * *